US012618927B2

(12) United States Patent
Hershberger

(10) Patent No.: US 12,618,927 B2
(45) Date of Patent: May 5, 2026

(54) LORAN TRANSMITTER, RECEIVER, SYSTEM AND METHOD OF OPERATING SAME

(71) Applicant: CONTINENTAL ELECTRONICS CORP., Dallas, TX (US)

(72) Inventor: David L. Hershberger, Nevada City, CA (US)

(73) Assignee: Continental Electronics Corp., Dallas, TX (US)

( * ) Notice: Subject to any disclaimer, the term of this patent is extended or adjusted under 35 U.S.C. 154(b) by 0 days.

(21) Appl. No.: 18/042,155

(22) PCT Filed: Aug. 18, 2021

(86) PCT No.: PCT/US2021/071225
§ 371 (c)(1),
(2) Date: Feb. 17, 2023

(87) PCT Pub. No.: WO2022/040687
PCT Pub. Date: Feb. 24, 2022

(65) Prior Publication Data
US 2023/0358841 A1      Nov. 9, 2023

Related U.S. Application Data

(60) Provisional application No. 63/067,015, filed on Aug. 18, 2020.

(51) Int. Cl.
*G01S 1/04*          (2006.01)
*G01S 1/24*          (2006.01)
*G01S 5/12*          (2006.01)

(52) U.S. Cl.
CPC ............ *G01S 1/0428* (2019.08); *G01S 1/245* (2013.01); *G01S 5/12* (2013.01)

(58) Field of Classification Search
CPC ........... G01S 1/0428; G01S 1/245; G01S 5/12
See application file for complete search history.

(56) References Cited

U.S. PATENT DOCUMENTS 6,028,890 A * 2/2000 Salami ................... H04M 11/06
                                                    375/216
2001/0043656 A1* 11/2001 Koslar ..................... H04B 1/69
                                                    375/E1.001

(Continued)

OTHER PUBLICATIONS

International Search Report and Written Opinion issued in corresponding International Application No. PCT/US2021/071225, dated Nov. 26, 2021, pp. 1-10, U.S. Patent and Trademark Office, Alexandria, Virginia.

(Continued)

*Primary Examiner* — Yuwen Pan
*Assistant Examiner* — Fatuma G Sherif
(74) *Attorney, Agent, or Firm* — Novel IP

(57)          ABSTRACT

A transmitter includes a Loran pulse generator, a dispersion filter, an equalizer, a power amplifier, an antenna tuner, and an antenna. The Loran pulse generator is configured to generate a Loran pulse signal. The dispersion filter is coupled to the Loran pulse generator, and is configured to generate a dispersed signal responsive to the Loran pulse signal. The equalizer is coupled to the dispersion filter, and is configured to generate an equalized dispersed signal responsive to the dispersed signal. The power amplifier is coupled to the equalizer, and configured to generate an amplified signal responsive to the equalized dispersed signal. The antenna tuner is coupled to the power amplifier, and is configured to generate a tuned signal responsive to the amplified signal. The antenna is coupled to the antenna tuner, and is configured to radiate a transmitted signal responsive to the tuned signal.

20 Claims, 26 Drawing Sheets

(56)                    References Cited

U.S. PATENT DOCUMENTS

| | | | | |
|---|---|---|---|---|
| 2003/0156624 | A1* | 8/2003 | Koslar | ..................... H04B 1/69 |
| | | | | 375/295 |
| 2006/0280227 | A1* | 12/2006 | Pinkney | ................... H04B 1/69 |
| | | | | 375/139 |
| 2008/0091350 | A1* | 4/2008 | Smith | ..................... G01S 19/46 |
| | | | | 701/472 |
| 2012/0161863 | A1* | 6/2012 | Hardy | ........................ G01S 1/24 |
| | | | | 327/560 |
| 2012/0300870 | A1* | 11/2012 | Dickey | ..................... H03F 3/24 |
| | | | | 375/295 |
| 2013/0287390 | A1 | 10/2013 | Abe et al. | |
| 2014/0342677 | A1 | 11/2014 | Blin | |
| 2017/0338841 | A1* | 11/2017 | Pratt | ................... H04B 1/0475 |
| 2018/0248570 | A1 | 8/2018 | Camuffo | |
| 2018/0267157 | A1 | 9/2018 | Guruprasad | |

OTHER PUBLICATIONS

An Office Action issued by the Canadian Intellectual Property Office on Jul. 25, 2024, which corresponds to Canadian Patent Application No. 3,189,536 and is related to U.S. Appl. No. 18/042,155.
Klauder et al: "The Theory and Design of Chirp Radars"; The Bell System Technical Journal, vol. XXXIX, Jul. 1960, No. 4, American Telephone and Telegraph Company.

\* cited by examiner

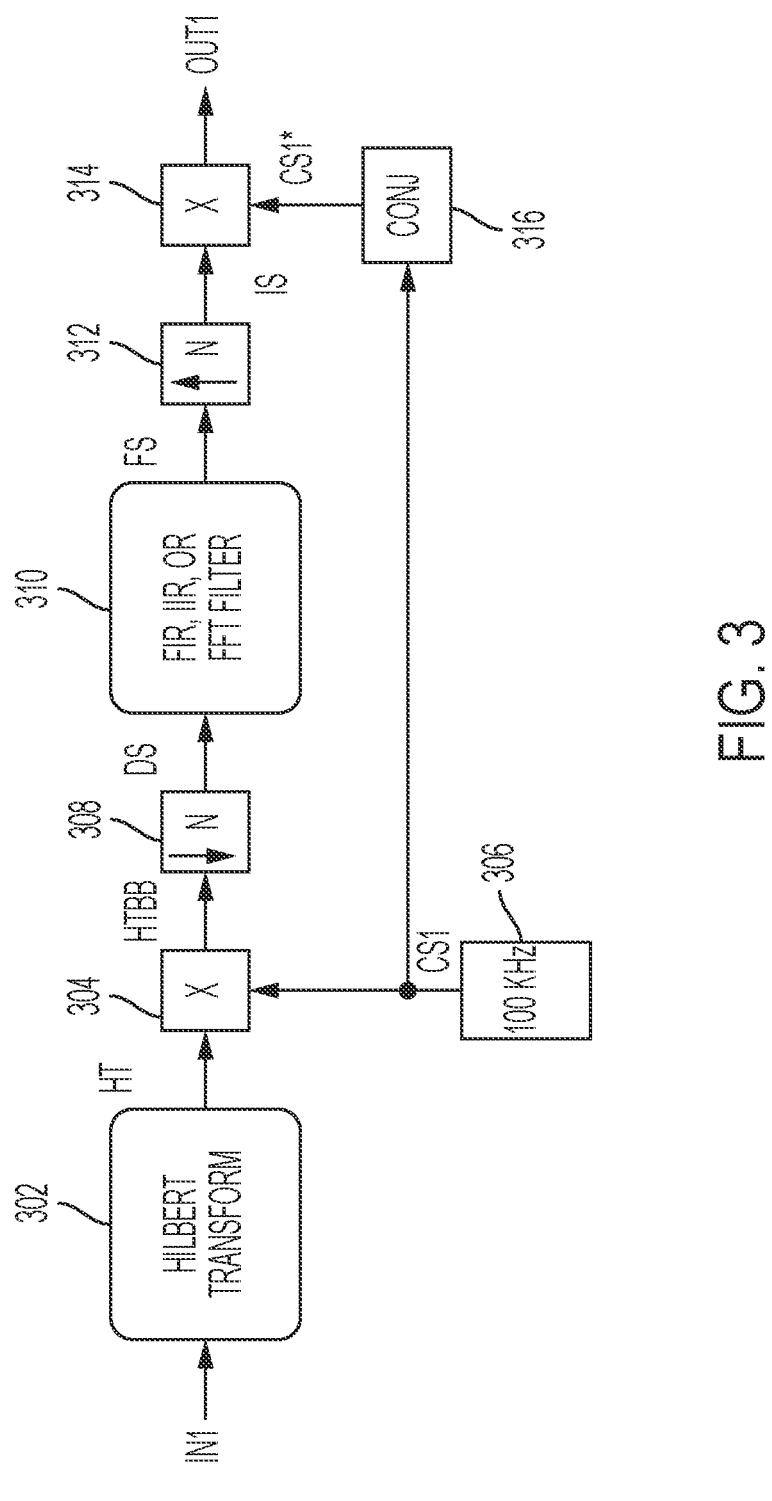
FIG. 3

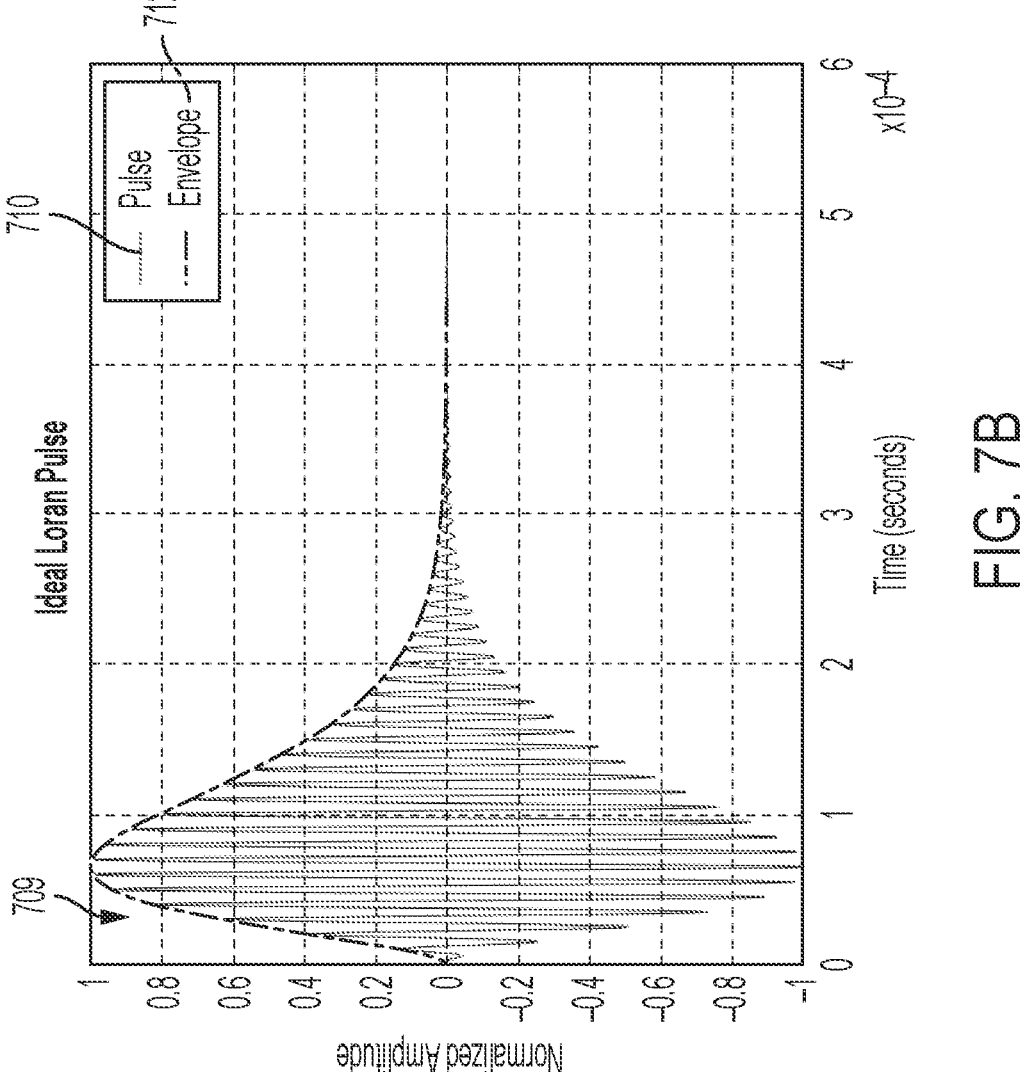
FIG. 7B

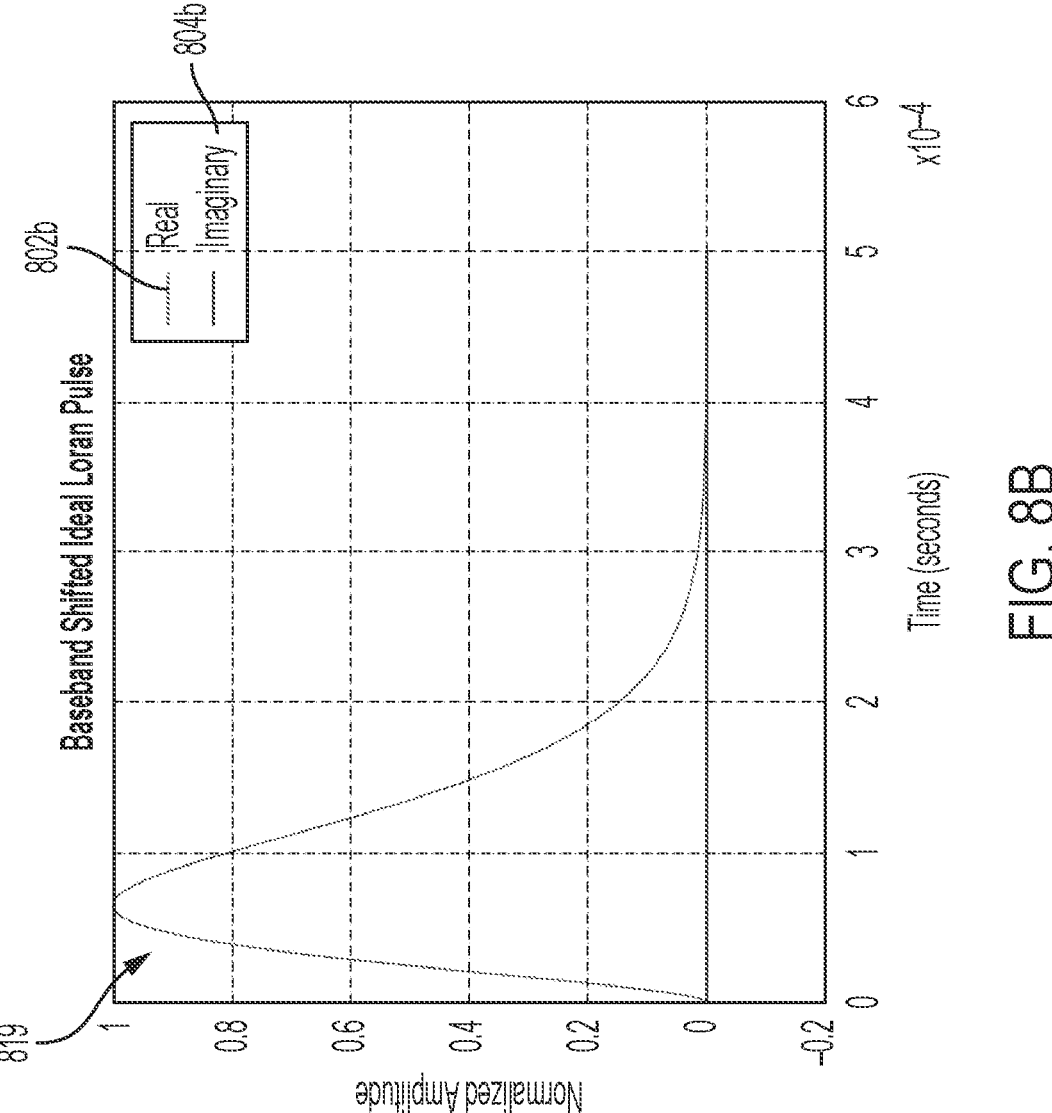
FIG. 8B

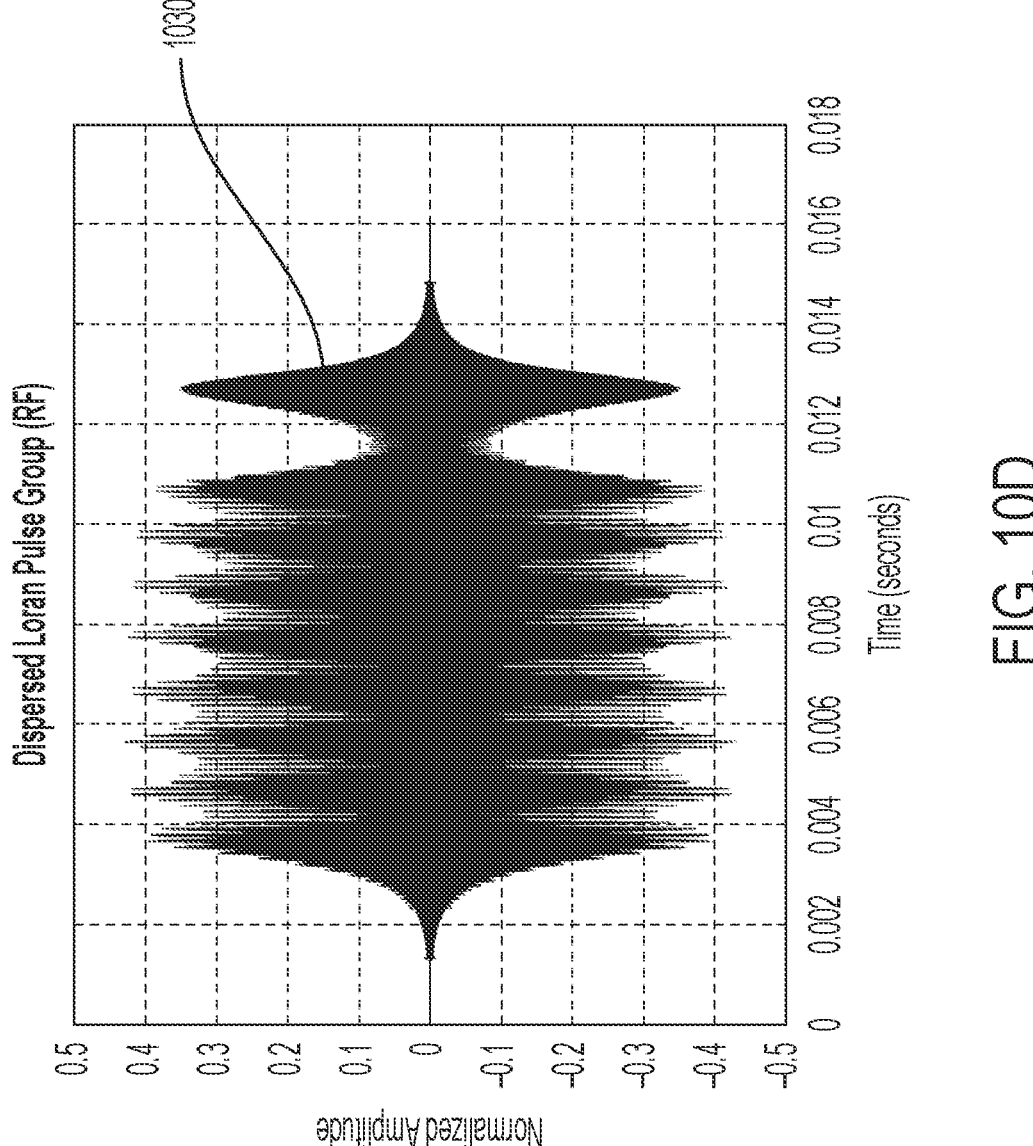
FIG. 10D
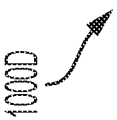

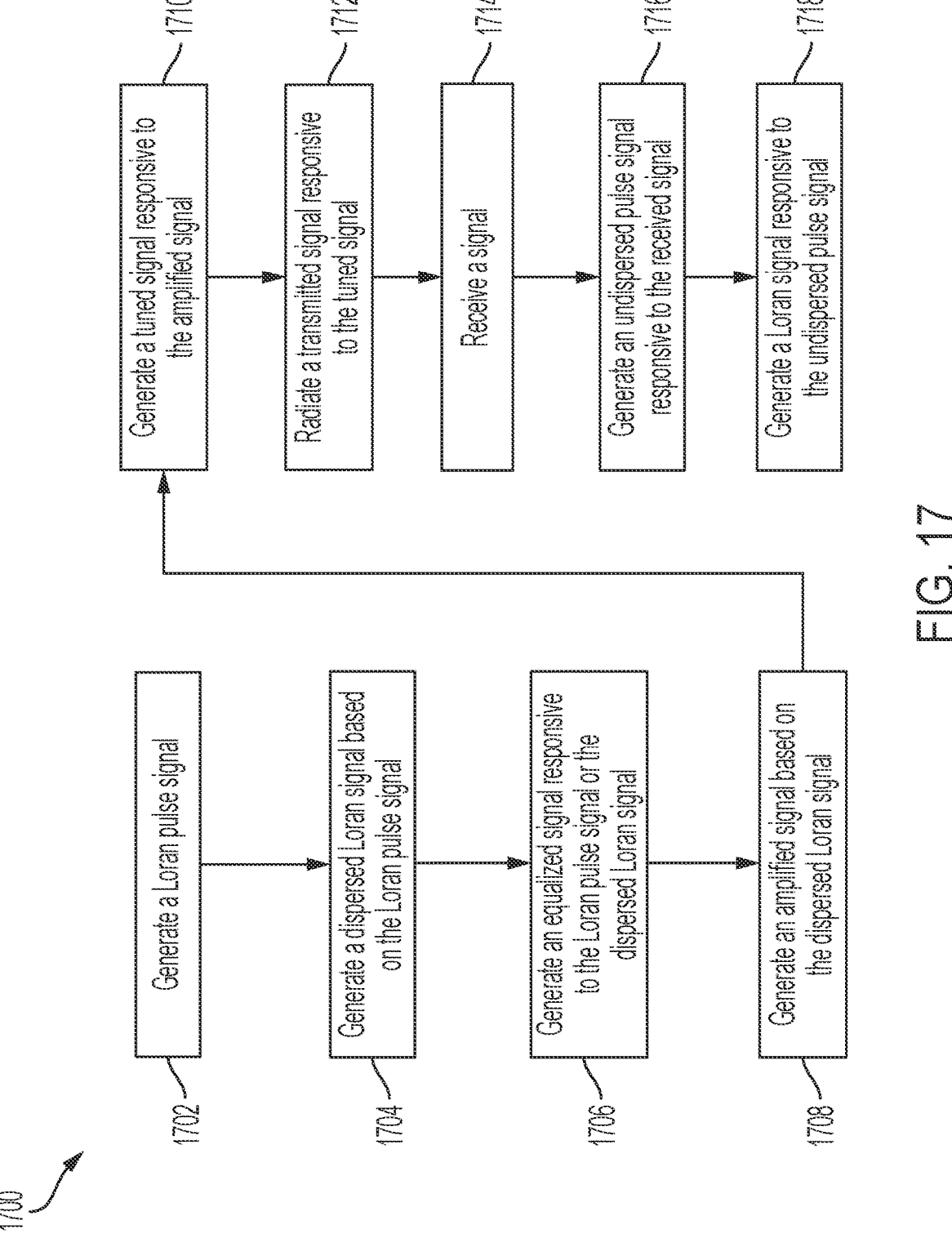

1710 Generate a tuned signal responsive to the amplified signal

1712 Radiate a transmitted signal responsive to the tuned signal

1714 Receive a signal

1716 Generate an undispersed pulse signal responsive to the received signal

1718 Generate a Loran signal responsive to the undispersed pulse signal

1702 Generate a Loran pulse signal

1704 Generate a dispersed Loran signal based on the Loran pulse signal

1706 Generate an equalized signal responsive to the Loran pulse signal or the dispersed Loran signal 1708 Generate an amplified signal based on the dispersed Loran signal

LORAN TRANSMITTER, RECEIVER, SYSTEM AND METHOD OF OPERATING SAME

PRIORITY CLAIM

The present application is a U.S. National Phase of International Application Number PCT/US2021/071225, filed Aug. 18, 2021, which claims the benefit of U.S. Provisional Application No. 63/067,015, filed Aug. 18, 2020.

BACKGROUND

Loran signals of some approaches include a number of short bursts of high amplitude pulses and are referred to as very "peaky." The peak to average power ratio of Loran signals of some approaches is very high. In vacuum tube transmitters, vacuum tubes designed for pulse service were used to generate the high peak powers. The pulse durations were approximately 200 microseconds, which was shorter than the thermal time constants of vacuum tubes designed for pulsed service. Such vacuum tubes could produce very high power, but only for a short time period.

Modern solid state transmitters of some approaches are generally peak power limited. Engineering solid state devices for pulse service is more difficult and less effective than doing so with vacuum tubes. The thermal time constant of a semiconductor power device of some approaches is much shorter than that of a pulse type vacuum tube. If a Loran pulse shape is retained, then the solid state transmitter used to produce the Loran pulse shape will have a relatively large number of power transistors for the produced average power.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a block diagram of a dispersion filter, in accordance with some embodiments.

FIG. 7B is a waveform diagram of a Loran pulse, in accordance with some embodiments.

FIG. 8B is a waveform diagram of the Hilbert transformed signal after being down converted to zero frequency, in accordance with some embodiments.

FIG. 10D is an RF waveform diagram of a dispersed Loran pulse group, in accordance with some embodiments.

FIG. 17 is a flowchart of a method of operating a system, in accordance with some embodiments.

DETAILED DESCRIPTION

Figure 1A:
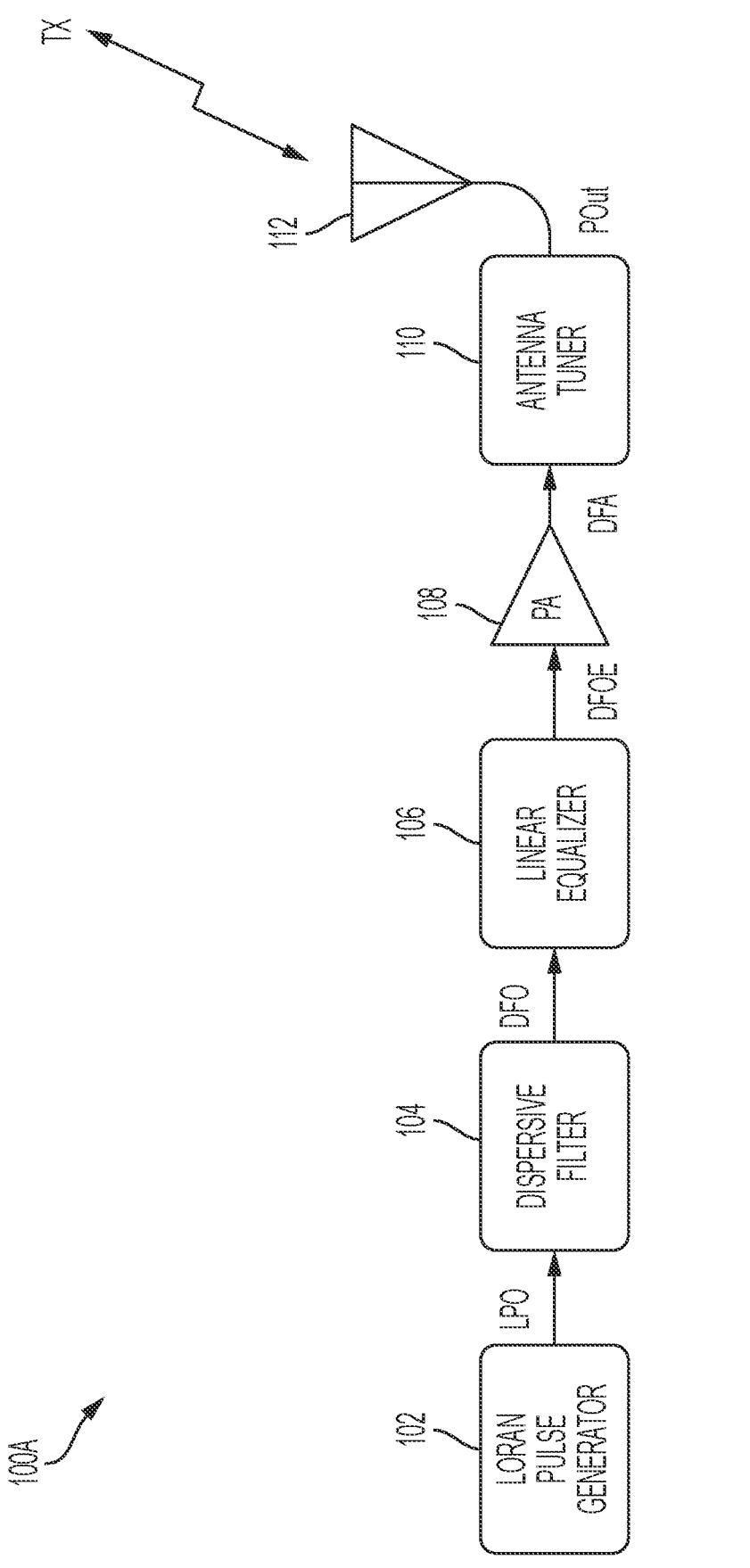
FIGS. 1A-1B are block diagrams of transmitters, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One or more embodiments of the present disclosure reduce the peak to average power ratio (PAPR) of a Loran signal. In some approaches, reducing peak to average ratio of pulsed signals was performed by the use of chirp radar. For example, chirp radar was developed to reduce the peak to average ratio of pulsed signals. Rather than generating very short, high power radar pulses, chirp radar of some approaches linearly dispersed the pulse with a network that had a constant group delay slope (that is, a delay function that varies with frequency) across the bandwidth of the radar pulse thereby turning a sinc or $\sin(\pi x)/(\pi x)$ pulse into a frequency modulated sweep. When passed through a complementary or matched filter at the receiver, the FM sweep was turned into a high amplitude, short duration pulse. The greater the time delay variation, the longer the FM sweep became, increasing the effective power of the received pulse.

In the 1950s and 1960s, modern digital signal processing was not available, and matched filters used for chirp radar were complex and expensive. The earliest such filters of some approaches were built as analog lumped-element all-pass filters of high order. Because the filtering was so expensive, a radar system would include one transmit filter and one receive filter. In the 1970s, such chirp radar systems used surface acoustic wave (SAW) filters for signal dispersion.

Although transmitter technology has changed from high power pulsed vacuum tubes to peak power-limited solid-state, signal processing technology has also changed resulting in techniques to make complicated filtering in a very cheap manner when compared with the cost of large transmitting antennas and transmitters capable of hundreds of kilowatts. In some embodiments, the peak power requirements of a Loran signal can be greatly reduced, making it a better match for solid state transmitters. In some embodiments, the peak power requirements of a Loran signal can be maintained like other approaches, but the average power can be greatly increased thereby making the signal more robust and overpowering atmospheric noise compared with other approaches.

Unlike chirp radar of some approaches, one or more embodiments of the present disclosure do not craft a new shape for the Loran pulse or reduce the "sidelobe" amplitudes. Moreover, the ability of this disclosure to differentiate between received skywave and groundwave signals is unaffected by the use of dispersion filters. In some embodiments, since the filtering is all linear, including the propagation path, the sequential order of the filters does not matter. In some embodiments, dispersing the Loran pulses, then passing them through the propagation path (another linear filter), and then passing them through the de-dispersion filter (i.e. inverse filter) at the receiver is equivalent to the reordered arrangement of the dispersion filter, the de-dispersion filter, and then the propagation path. In some embodiments, since the dispersion filter cascaded with the de-dispersion filter preserves the Loran pulse shape, and is equivalent to Loran, including its ability to distinguish groundwave from skywave. In some embodiments, once the received signal has been de-dispersed, the Loran receiver with signal processing may be used. One or more embodiments of the present disclosure include a dispersion filter and its inverse filter, or a large set of filter pairs that minimize peak power requirements of a transmitter for a particular signal. In some embodiments, the dispersion filter is configured to perform dispersive filtering. In some embodiments, the dispersion filter is performed by digital signal processing. In some embodiments, the digital signal processing is much cheaper compared to past analog methods, and can be practically implemented in mass produced Loran receivers. In some embodiments, minimizing peak power results in minimizing antenna voltage. In some embodiments, at low frequencies with electrically short antennas, the power for a given antenna is usually limited by antenna voltage. In some embodiments, if antenna voltage is reduced, then shorter towers are used with a corresponding reduction in the amount of land required for a transmitter site. In some embodiments, a dispersion signal is used for encryption or selective availability of the Loran signal. In some embodiments, by increasing the average power, sufficient signal to noise ratio (SNR) improvement is obtained resulting in more airtime for a Loran Data Channel (LDC). In some embodiments, the dispersion filter has a flat amplitude response. In some embodiments, a flat amplitude response means that the spectral shape of the transmitted signal is the same as it would be without the dispersion filter. In some embodiments, since the spectral shape of the transmitted signal is unchanged, the dispersed Loran signals are compatible with existing allocations for Loran, and the "haystack" spectral shape of the Loran signal is retained, and has the further advantage of not being configured to use higher current (or voltage) from the transmitter. Electrically short antennas can be used for Loran, which results in reactive impedances at sideband frequencies being presented to the transmitter by the antenna matching network. If the spectrum of the Loran signal were changed to a more rectangular shape, where more power is radiated away from the channel center, the transmitter's output current (or voltage) requirement would increase for the same radiated power. As more power is radiated at frequencies where the transmitter's load impedance is reactive, more current (or voltage) is required from the transmitter even though the radiated power does not increase. Whether the transmitter produces more current or voltage will depend on the type of antenna matching network used. In some embodiments, at least two advantages of retaining the same spectral shape of the transmitted signal are (1) compatibility with existing allocations, and (2) the ability to radiate more power.

FIG. 1A is a block diagram of a transmitter 100A, in accordance with some embodiments.

Transmitter 100A is configured to generate and transmit a radiated or transmitted signal TX. In some embodiments, the radiated or transmitted signal TX is a Loran signal. In some embodiments, the transmitter 100A is a dispersed Loran transmitter.

The transmitter 100A includes a Loran pulse generator 102 configured to generate a set of Loran pulses or signals LPO. A set of Loran pulses 702 is shown in FIG. 7.

The transmitter 100A further includes a dispersion filter 104 coupled to the Loran pulse generator 102, and configured to generate a dispersed signal DFO responsive to a Loran signal of the set of Loran signals LPO. The dispersed signal DFO is dispersed in time when compared with the Loran signal.

In some embodiments, at the transmitter 100A, pulse dispersion is accomplished by passing the Loran signal through the dispersion filter 104 (e.g., an all-pass network), which has the effect of dispersing a short pulse into a signal of longer duration and reducing the peak power.

The transmitter 100A further includes an equalizer 106 coupled to the dispersion filter 104, and configured to generate an equalized dispersed signal DFOE responsive to the dispersed signal DFO. In some embodiments, the equalizer 106 is a linear equalizer. The equalizer 106 is configured to correct for system response (e.g., linear distortions) of an antenna 112. Equalized dispersed signal DFOE is an equalized version of the dispersed signal DFO. In some embodiments, the equalized dispersed signal DFOE is equalized so that the antenna current of antenna 112 meets Loran design requirements. In some embodiments, the equalized dispersed signal DFOE is equalized so that the radiated signal TX meets Loran design requirements.

Figure 1B:
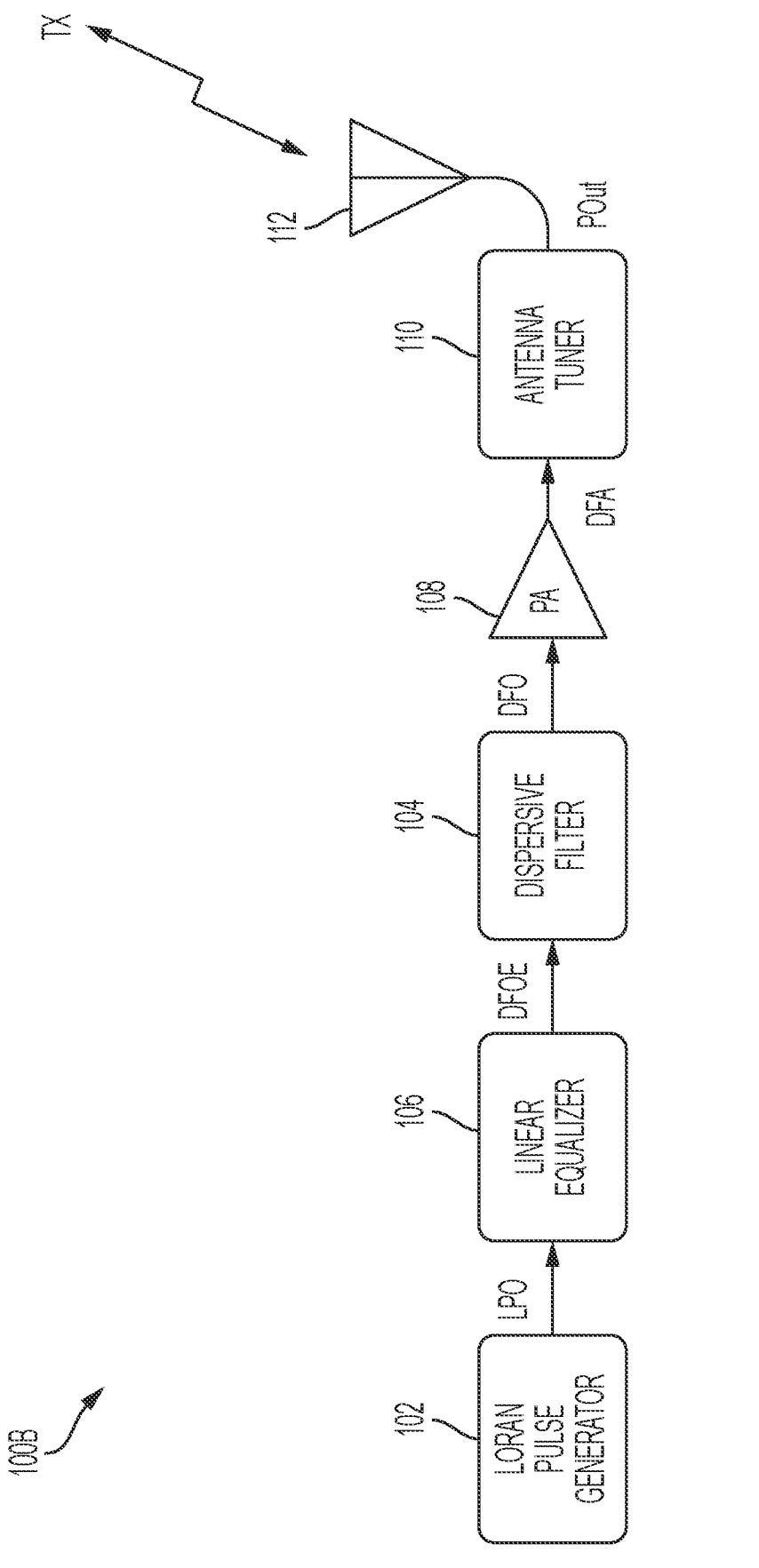

The equalizer 106 is between the dispersion filter 104 and a power amplifier 108. In some embodiments, the equalizer 106 is between the dispersion filter 104 and the Loran pulse generator 102, as shown in FIG. 1B.

The transmitter 100A further includes a power amplifier 108 coupled to the equalizer 106, and configured to generate an amplified signal DFA responsive to the equalized dispersed signal DFOE. Amplified signal DFA is an amplified version of the equalized dispersed signal DFOE. The power amplifier 108 is between the equalizer 106 and an antenna tuner 110.

The transmitter 100A further includes an antenna tuner 110 coupled to the power amplifier 108, and configured to generate a tuned signal POut responsive to the amplified signal DFA. Tuned signal POut is a tuned version of the amplified signal DFA.

The transmitter 100A further includes an antenna 112 coupled to the antenna tuner, and configured to radiate a transmitted signal TX responsive to the tuned signal POut. In some embodiments, the transmitted or radiated signal TX (e.g., output from antenna 112) corresponds to a dispersed ideal waveform.

In some embodiments, a transmitter signal (e.g., signal DFA) or transmitter output voltage (e.g., output by the power amplifier 108) is different from the transmitted or radiated signal TX. In some embodiments, the transmitter signal (e.g., signal DFA) includes equalization so that the transmitted or radiated signal TX accounts for antenna system response. In some embodiments, the transmitter output voltage (e.g., signal DFA) of the power amplifier 108 is different from the radiated signal TX from antenna 112.

FIG. 1B is a block diagram of a transmitter 100B, in accordance with some embodiments.

In some embodiments, the transmitter 100B is a dispersed Loran transmitter.

Transmitter 100B is a variation of transmitter 100A of FIG. 1A, and similar detailed description is therefore omitted. In comparison with transmitter 100A of FIG. 1A, the equalizer 106 of transmitter 100B is between the dispersion filter 104 and the Loran pulse generator 102, and similar detailed description is therefore omitted.

The equalizer 106 is between the dispersion filter 104 and the Loran pulse generator 102. The equalizer 106 is coupled to an output of the Loran pulse generator 102, and an input of the dispersion filter 104.

The dispersion filter 104 is coupled to an output of the equalizer 106, and an input of the power amplifier 108.

The power amplifier 108 is coupled to the dispersion filter 104. The power amplifier 108 is between the dispersion filter 104 and the antenna tuner 110.

The equalizer 106 is configured to generate the equalized pulse signal DFOE responsive to the Loran pulse signal LPO. The dispersion filter 104 is configured to generate the dispersed Loran signal DFO responsive to the equalized pulse signal DFOE. The power amplifier 108 is configured to generate the amplified signal DFA responsive to the dispersed Loran signal DFO.

Figure 2:
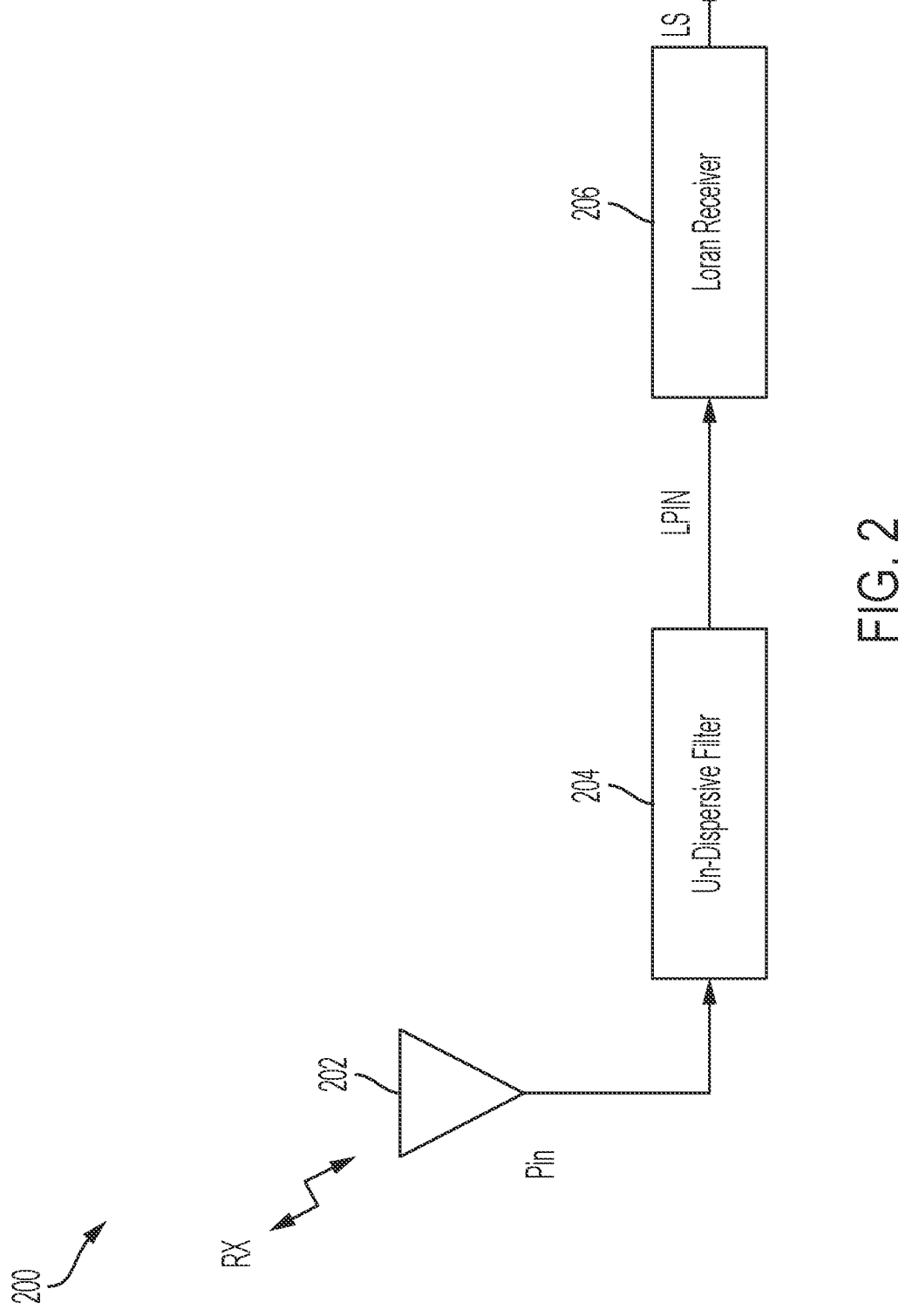
FIG. 2 is a block diagram of a receiver, in accordance with some embodiments.

FIG. 2 is a block diagram of a receiver 200, in accordance with some embodiments.

In some embodiments, receiver 200 is a dispersed Loran receiver.

Receiver 200 is configured to receive and demodulate a received signal RX. At receiver 200, the received signal RX is passed through a complementary network, which removes the pulse dispersion from the transmitter 200 thereby restoring the Loran pulse shape. In these embodiments, the entire process of adding and removing dispersion to Loran signals is linear. In some embodiments, propagation is also linear.

Receiver 200 includes an antenna 202 configured to receive the received signal RX, and to generate a signal Pin. The received signal RX corresponds to the transmitted signal TX of FIG. 1.

Receiver 200 further includes an un-dispersion filter 204 coupled to the antenna 202. The un-dispersion filter 204 is coupled between receiving antenna 202 and a Loran receiver 206. The un-dispersion filter 204 is configured to generate an undispersed pulse signal LPIN responsive to the signal Pin. In some embodiments, the undispersed pulse signal LPIN corresponds to a set of Loran signals that are not dispersed.

In some embodiments, the un-dispersion filter 204 is configured to remove dispersion from a set of dispersed Loran signals (E.g., Pin), and generates or restores a set of Loran signals (e.g., LPIN). In some embodiments, the set of Loran signals (e.g., LPIN) are similar to Loran signals of other approaches. In some embodiments, the un-dispersion filter 204 is useable for development and system testing, and is configured to drive Loran receivers of other approaches with un-dispersed Loran pulses LPIN.

In some embodiments, the output of the un-dispersion filter 204 is configured to output restored high amplitude Loran pulses. In some embodiments, receiver techniques of other approaches can be re-used and modernized by the use of the un-dispersion filter 204.

In some embodiments, dispersion filter 104 in transmitter 100A-100B is configured to introduce dispersion into the Loran signal, and un-dispersion filter 204 in receiver 200 is configured to remove dispersion (previously added by dispersion filter 104) from the Loran signal, and thus dispersion filter 104 and un-dispersion filter 204 are configured to operate in a complementary manner.

An example of the undispersed pulse signal LPIN is shown below as waveforms 1100A-1100B in FIGS. 11A-11B.

Receiver 200 further includes a Loran receiver 206 coupled to the un-dispersion filter 204. The Loran receiver 206 is configured to generate an output signal LS responsive to the undispersed pulse signal LPIN. The Loran receiver 206 is configured to demodulate the undispersed pulse signal LPIN (e.g., the Loran signal). In some embodiments, the output signal LS corresponds to output signals of Loran receivers of other approaches.

In some embodiments, the Loran receiver 206 is similar to other approaches. In some embodiments, the downstream part of the dispersed Loran receiver 206 is identical to Loran receivers of other approaches, and is configured to search for zero crossings at a beginning of a 4th RF cycle at 30 microseconds, or the like.

In some embodiments, the un-dispersion filter 204 is separable from the Loran receiver 206. In some embodiments, the un-dispersion filter 204 and the Loran receiver 206 are separate components from each other. In some embodiments, the un-dispersion filter 204 and the Loran receiver 206 are integrated into a single device.

In some embodiments, dispersing a Loran pulse group (e.g., by dispersion filter 104), transmitting it, receiving it, and removing the dispersion (e.g., by un-dispersion filter 204) is equivalent to transmitting and receiving Loran pulse groups of other approaches, except that the peak power is much less. In some embodiments, the techniques of Loran service of other approaches is usable with one or more embodiments of the present disclosure thereby causing the received signal RX to be significantly stronger with solid state transmitters than other approaches. In some embodiments, the power density spectrum of the dispersed Loran signal is similar to the Loran signals of other approaches, thereby resulting in no change in the spectral shape and causing no changes to the allocation structure at 100 kHz when compared with other approaches.

In some embodiments, a stronger Loran signal requires less pulse averaging in order to obtain a desired level of accuracy. For example, in some embodiments, if fewer pulses are used, this results in more available airtime for transmission of Loran Data Channel (LDC) data at a higher data rate, thereby allowing for more channel utilization for other resources.

Loran Data Channel transmission is usable with other approaches with relatively low data throughput (such as 5 bits per GRI). These other approaches have systems that work by modulating one or more of the Loran pulses in different ways, but usually by phase modulation in several different forms. These other approaches use different schemes to co-exist with navigation and timing aspects of the Loran signal, and rely on averaging to cancel out LDC modulation. However, these other approaches do not have enhanced Loran accuracy, which requires increased LDC capacity and is not available with existing LDC modulation methods.

One or more embodiments of this disclosure have enhanced Loran accuracy. One or more embodiments of this disclosure allow effectively higher power pulses to be transmitted with the same antenna voltage, which allows increased "air time" to be allocated to a new LDC signal, that is separate from Loran navigation and timing pulses. In some embodiments, using a separate LDC signal with a different modulation format (such as BPS K) than Loran navigation and timing pulses, causes one or more embodiments of the present disclosure to have higher data capacity.

FIG. 3 is a block diagram of a dispersion filter 300, in accordance with some embodiments.

Dispersion filter 300 is an embodiment of dispersion filter 104 of FIG. 1 or the un-dispersion filter 204 of FIG. 2, and similar detailed description is therefore omitted.

In some embodiments, the dispersion filter 300 is usable as the dispersion filter 104 in the transmitter 100A-100B of FIGS. 1A-1B. In some embodiments, the dispersion filter 300 of FIG. 3 is usable as the un-dispersion filter 204 in the receiver 200 of FIG. 2.

Dispersion filter 300 is configured to receive a signal IN1, and to generate a signal OUT1.

Dispersion filter 300 includes a Hilbert transform device 302 configured to receive the Loran pulse signal (e.g., IN1). The Loran pulse signal IN1 of FIG. 3 corresponds to the set of Loran signals LPO of FIG. 1A, the equalized signal DFOE of FIG. 1A, or the set of Loran signals LPO or signal Pin of FIG. 2.

Hilbert transform device 302 is configured to generate a signal HT. Signal HT includes a signal I (not shown) and a signal Q (not shown). In some embodiments, signal Q is offset from signal I by a phase of 90 degrees. Other phase values are within the scope of the present disclosure.

In some embodiments, the input signal IN1 to the dispersion filter is a real signal. The real signal is converted to a complex or analytic signal by Hilbert transform device 302 thereby generating a Hilbert transform waveform (e.g., signal HT). In some embodiments, after the Hilbert transform, the subsequent processing, by the dispersion filter 300, is performed on the Hilbert transformed signal as an I/Q signal pair.

An example of the input signal IN1 is shown below as waveforms 700A-700C in FIGS. 7A-7C. An example of signal HT is shown below as waveform 800A in FIG. 8A.

Dispersion filter 300 further includes a multiplier 304 coupled to the Hilbert transform device 302 and a carrier generator 306.

Multiplier 304 is configured to generate a frequency shifted signal HTBB in response to at least a carrier signal CS1 and signal HT. In some embodiments, multiplier 304 is configured to generate frequency shifted signal HTBB in response to at least carrier signal CS1, signal I and signal Q. In some embodiments, the frequency shifted signal HTBB corresponds to signal HT shifted to baseband or having a center frequency of 0 Hz. In some embodiments, a frequency of the carrier signal CS1 is 100 kHz. In some embodiments, the carrier signal CS1 is a complex sinusoid (e.g., sine wave and cosine wave) with a carrier frequency at 100 kHz. Other carrier frequencies for carrier signal CS1 are within the scope of the present disclosure.

In some embodiments, after the Hilbert transform, the complex signal (e.g., signal HT) is down converted to a frequency of 0 hertz. In some embodiments, the complex signal (e.g., signal HT) is down converted to a signal (e.g., frequency shifted signal HTBB) having a frequency substantially equal to 0 hertz. For example, in some embodiments, the complex signal (e.g., signal HT) is down converted by multiplying the analytic input signal by a complex sinusoid (sine wave and cosine wave) at 100 kHz. In some embodiments, substantially includes items that vary from the reference plus or minus 5%.

An example of the frequency shifted signal HTBB is shown below as waveform 800B in FIG. 8B.

Carrier generator 306 is coupled to multiplier 304 and a circuit 316.

Carrier generator 306 is configured to generate carrier signal CS1. In some embodiments, carrier signal CS1 is a sinusoid (e.g., sine wave and cosine wave) at 100 kHz. In some embodiments, the real component and the complex component of the carrier signal CS1 is a continuous wave signal having a similar fundamental frequency.

Dispersion filter 300 further includes a decimator 308 coupled to the multiplier 304.

Decimator 308 is configured to generate a down-sampled signal DS in response to the frequency shifted signal HTBB. Decimator 308 is configured to reduce or decrease the sampling rate of frequency shifted signal HTBB. Down-sampled signal DS has less samples than frequency shifted signal HTBB for a same duration of time.

In some embodiments, following the down conversion by the multiplier 304, the Loran signal's sampling rate is decimated by decimator 308. In some embodiments, decimated means the sampling rate of the Loran signal is decreased. In some embodiments, a decimator reduces the sampling rate of a signal.

Dispersion filter 300 further includes a filter 310 coupled to the decimator 308. Filter 310 is configured to generate a filtered down-sampled signal FS in response to the down-sampled signal DS. An example of the filtered down-sampled signal FS is shown below as waveform 1000B in FIG. 10B.

In some embodiments, dispersion filter 300 is included in transmitter 100A-100B as dispersion filter 104, and filter 310 is configured to introduce dispersion into the Loran signal. In some embodiments, dispersion filter 300 is included in receiver 200 as un-dispersion filter 204, and filter 310 is configured to remove dispersion (previously added by dispersion filter 104) from the Loran signal, and thus dispersion filter 104 and un-dispersion filter 204 are configured to operate in a complementary manner.

In some embodiments, filter 310 includes an all-pass filter. In some embodiments, an amplitude function of filter 310 is substantially flat and has unity gain so as not to disturb the spectral shape of the Loran signal. In some embodiments, the group delay and phase function of filter 310 are configured to reduce the Loran signal's peak envelope levels.

In some embodiments, filter 310 is a complex filter. In some embodiments, filter 310 includes at least a finite impulse response (FIR) filter, an infinite impulse response (IIR) filter, or a fast Fourier transform (FFT) filter. Other filter types are within the scope of the present disclosure.

Dispersion filter 300 further includes an interpolator 312 coupled to the filter 310. Interpolator 312 is configured to generate an up-sampled signal IS in response to the filtered down-sampled signal FS.

In some embodiments, after filtering is complete, the filtered signal (e.g., filtered down-sampled signal FS) is interpolated back to the original sampling rate by interpolator 312.

Dispersion filter 300 further includes a multiplier 314 coupled to the interpolator 312 and the circuit 316. Multiplier 314 is configured to generate a signal OUT1 in response to at least the up-sampled signal IS and a carrier signal CS1*. In some embodiments, the carrier signal CS1* is a conjugate of carrier signal CS1. In some embodiments, the signal OUT1 of FIG. 3 is a dispersed signal, and corresponds to dispersed signal DFO of FIGS. 1A-1B. In some embodiments, the signal OUT1 of FIG. 3 is an undispersed signal, and corresponds to un-dispersed Loran pulses LPIN of FIG. 2.

In some embodiments, after interpolation, the baseband signal (e.g., FS) is multiplied by the conjugate (e.g., CS1*) of the complex sinusoid, thereby shifting the center frequency back to the original 100 kHz frequency. In some embodiments, the signal (e.g., OUT) remains complex after the baseband signal is multiplied by the conjugate of the complex sinusoid. In some embodiments, the imaginary or quadrature component of the signal is discarded, and the real part of the signal is used downstream, for example, by other devices. In some embodiments, the signal is converted back to 100 kHz RF as shown by waveform 1000D in FIG. 10D below. In some embodiments, other center frequency values are within the scope of the present disclosure.

Circuit 316 is coupled to carrier generator 306 and multiplier 314. Circuit 316 is configured to generate carrier signal CS1*. In some embodiments, circuit 316 is configured to generate a conjugate of carrier signal CS1 by shifting the sign of the imaginary portion of carrier signal CS1. In some embodiments, circuit 316 is a circuit, such as system 1600, configured to perform conjugation of carrier signal CS1. In some embodiments, circuit 316 is a DSP, such as processor 1602 of FIG. 16, configured to perform conjugation of carrier signal CS1.

In some embodiments, dispersion filter 300 of FIG. 3 has fixed filter coefficients for each set of Loran pulses. In some embodiments, dispersion filter 300 of FIG. 3 has filter coefficients that vary with time for each set of Loran pulses. In some embodiments, the filter coefficients are time varying over a pulse group. In some embodiments, the time varying filter coefficients can be used as a method of encrypting data or selective availability. In some embodiments, time-varying filter coefficients are modulated streams including phase modulation, and thus alter the spectrum of the Loran signal.

Other configurations, number of components or order of components for dispersion filter 300 are within the scope of the present disclosure. For example, in some embodiments, dispersion filter 300 does not include Hilbert transform device 302, multiplier 304, carrier generator 306, decimator 308, interpolator 312, multiplier 314 and circuit 316. In other words, in these embodiments, dispersion filter 300 is configured to filter signal IN1, where signal IN1 is a real signal (e.g., not complex) without being down-converted to baseband and down-sampled, and then being further up-sampled and up-converted after filtering by the filter 310.

Figure 4:
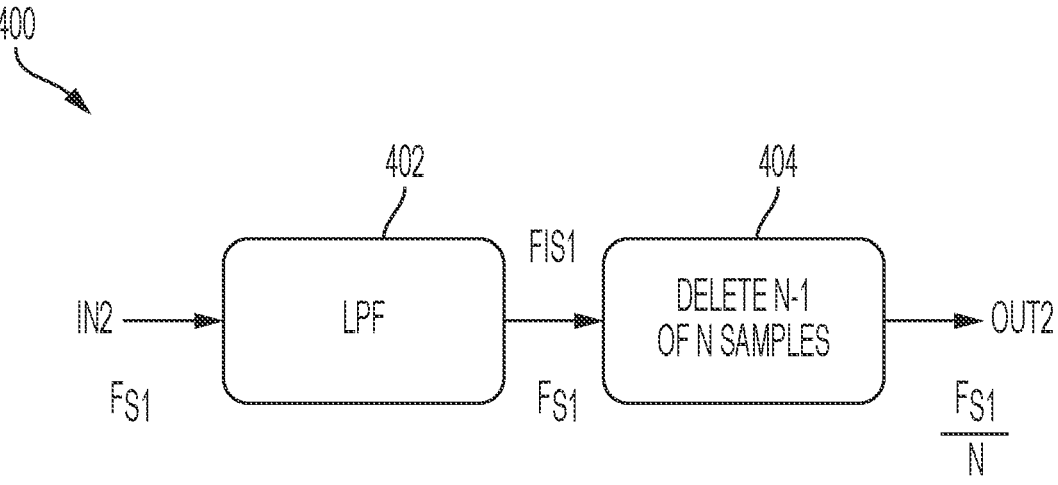
FIG. 4 is a block diagram of a decimator, in accordance with some embodiments.

FIG. 4 is a block diagram of a decimator 400, in accordance with some embodiments.

Decimator 400 is an embodiment of decimator 308 of FIG. 3, and similar detailed description is therefore omitted. In some embodiments, the decimator 400 is usable as the decimator 308 in the dispersion filter 300 of FIG. 3.

Decimator 400 is configured to receive a signal IN2, and to generate a signal OUT2. The signal IN2 of FIG. 4 corresponds to the frequency shifted signal HTBB of FIG. 2. The signal OUT2 of FIG. 4 corresponds to the down-sampled signal DS of FIG. 2.

Decimator 400 includes a low pass filter 402. The low pass filter 402 is coupled to the multiplier 304 of FIG. 3. Low pass filter 402 is configured to generate a filtered signal FIS1 in response to the frequency shifted signal HTBB. The frequency shifted signal HTBB has a sample frequency $F_{S1}$. The filtered signal FIS1 has the sample frequency $F_{S1}$ Decimator 400 further includes a circuit 404 coupled to an output of the low pass filter 402. An output of circuit 404 is coupled to an input of the filter 310 of FIG. 3. Circuit 404 is configured to delete N−1 samples of N samples of the filtered signal FIS1 thereby generating the down-sampled signal DS. In some embodiments, the down-sampled signal DS has a sample frequency $F_{S2}$ equal to the sample frequency $F_{S1}$ divided by the N samples (e.g., $F_{S1}/N$), where N is an integer.

In some embodiments, the sampling rate $F_{S2}$ is greater than the bandwidth of the filtered signal FIS1. In some embodiments, the bandwidth of the Loran receiver 200 is at least 30 kHz, and the decimated signal OUT2 has at least a 100 kHz bandwidth signal (50 to 150 kHz) to provide ample headroom. In one or more of the simulations described below, a sampling rate of 125 kHz is used for the zero frequency-shifted Loran signals. In some embodiments, other sampling rates are within the scope of the present disclosure.

In some embodiments, the low-pass filter 402 is configured to prevent aliasing at the output sampling rate (e.g., $F_{S2}$). In some embodiments, circuit 404 is a circuit, such as system 1600, configured to perform a discarding function. In some embodiments, circuit 404 is a DSP, such as processor 1602 of FIG. 16, configured to perform a discarding function.

In some embodiments, the discarding function discards unused samples. In some embodiments, for example, if a decimation ratio is 8, then one of every 8 samples will appear at the output of decimator 400, and the other 7 samples are discarded by the discarding function (e.g., circuit 404). In some embodiments, an efficient decimator will not calculate unused output samples.

In some embodiments, as the sampling rate of the decimator 400 is reduced, the number of filter terms in filter 310 is also reduced proportionally. Thus, decimator 400 is configured to make efficient use of the digital signal processing resources of dispersion filter 300. In some embodiments, the multiplication rate is also improved by the square of the decimation ratio.

Other configurations, number of components or order of components for decimator 400 are within the scope of the present disclosure.

Figure 5:
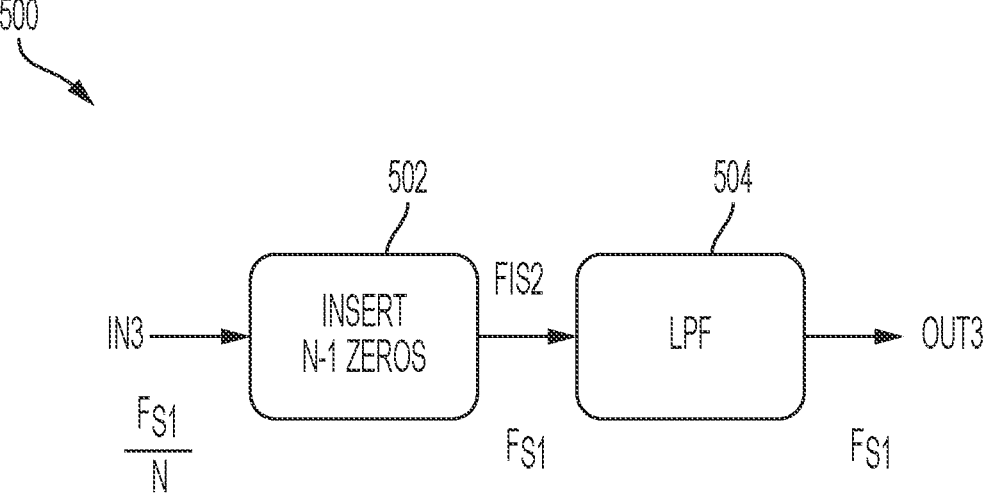
FIG. 5 is a block diagram of an interpolator, in accordance with some embodiments.

FIG. 5 is a block diagram of an interpolator 500, in accordance with some embodiments.

Interpolator 500 is an embodiment of interpolator 312 of FIG. 3, and similar detailed description is therefore omitted. In some embodiments, the interpolator 500 is usable as the interpolator 312 in the dispersion filter 300 of FIG. 3.

Interpolator 500 is configured to receive a signal IN3, and to generate a signal OUT3. The signal IN3 of FIG. 5 corresponds to the filtered down-sampled signal FS of FIG. 2. The signal OUT3 of FIG. 5 corresponds to the up-sampled signal IS of FIG. 2.

Interpolator 500 includes a circuit 502. In some embodiments, an input of circuit 502 is coupled to an output of filter 310 of FIG. 3. Circuit 502 is configured to add N−1 zeros to the filtered down-sampled signal FS thereby generating a signal FIS2. In some embodiments, the signal FIS2 has the sample frequency $F_{S1}$.

In some embodiments, circuit 502 is configured to interpolate the filtered down-sampled signal FS with a sampling rate of $F_{S2}$ back to the original sampling rate $F_{S1}$. In some embodiments, circuit 502 is configured to zero pad or insert zero valued samples to the filtered down-sampled signal FS thereby increasing the sampling rate to sampling rate $F_{S2}$ of signal FIS2. In some embodiments, the insertion of zero valued samples to increase the sampling rate is in effect a modulation process.

In some embodiments, circuit 502 is a circuit, such as system 1600, configured to perform a zero padding function in the time domain. In some embodiments, circuit 502 is a DSP, such as processor 1602 of FIG. 16, configured to perform a zero padding function in the time domain.

Interpolator 500 further includes a low pass filter 504. An input of the low pass filter 504 is coupled to an output of the circuit 502. An output of the low pass filter 504 is coupled to the multiplier 314 of FIG. 3. Low pass filter 504 is configured to generate the up-sampled signal IS in response to the signal FIS2.

In some embodiments, the zero insertion process performed by circuit 502 is followed by a low-pass filtering operation performed by low-pass filter 504, which removes the unwanted replicated spectra centered at harmonics of $Fs_1/N$.

Other configurations, number of components or order of components for interpolator 500 are within the scope of the present disclosure.

Figure 6A:
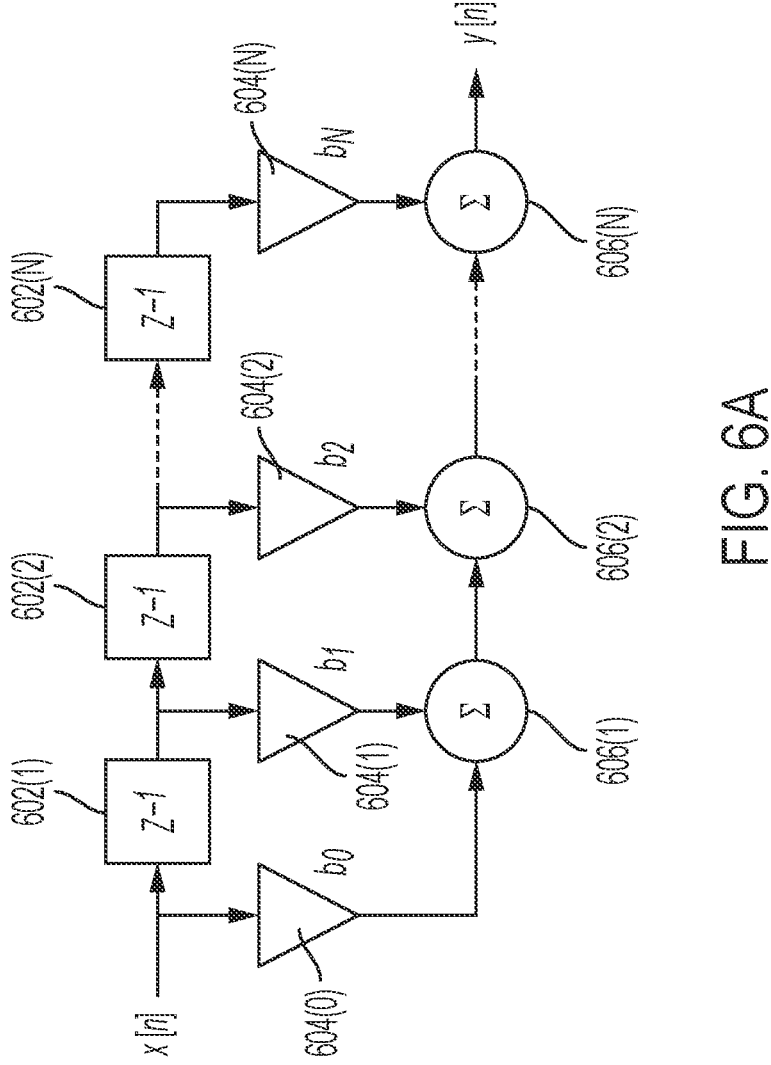
FIG. 6A is a block diagram of an FIR filter, in accordance with some embodiments.
Figure 6A:

FIG. 6A is a block diagram of an FIR filter 600A, in accordance with some embodiments.

FIR filter 600A is an embodiment of filter 310 of FIG. 3, and similar detailed description is therefore omitted. In some embodiments, the FIR filter 600A is usable as the filter 310 in the dispersion filter 300 of FIG. 3.

FIR filter 600A is configured to receive x[n] values of down-sampled signal DS (shown in FIG. 3), and to generate y[n] values of the filtered down-sampled signal FS (shown in FIG. 3). FIR filter 600A is of order N, where N is an integer.

FIR filter 600A includes N delay elements 602(1), 602(2), . . . , 602(N) (hereinafter referred to as "set of delay elements 602") coupled in series with each other.

FIR filter 600A further includes N+1 multiplier elements 604(0), 604(1), 604(2), . . . , 604(N) (hereinafter referred to as "set of multiplier elements 604"). Each multiplying element has a corresponding multiplier coefficient $b_0$, $b_1$, . . . , $b_N$. In some embodiments, each multiplier coefficient $b_0$, $b_1$, . . . , $b_N$ is the same as another multiplier coefficient. In some embodiments, at least one multiplier coefficient $b_0$, $b_1$, . . . , $b_N$ is different from another multiplier coefficient. In some embodiments, at least one or more multiplier coefficients $b_0$, $b_1$, . . . , $b_N$ change or are dynamic with respect to time.

FIR filter 600A further includes N summing elements 606(1), 606(2), . . . , 606(N) (hereinafter referred to as "set of summing elements 606") coupled in series with each other.

The set of delay elements 602, the set of multiplier elements 604 and the set of summing elements 606 are coupled together and generate the output signal y[n].

In some embodiments, at least the x[n] values, the $b_n$ values, or the y[n] values are complex numbers. In some embodiments, FIR filter 600A is complex.

Other filter types for FIR filter 600A are within the scope of the present disclosure. For example, in some embodiments, FIR filter 600A includes at least an IIR filter or an FFT filter.

Figure 6B:
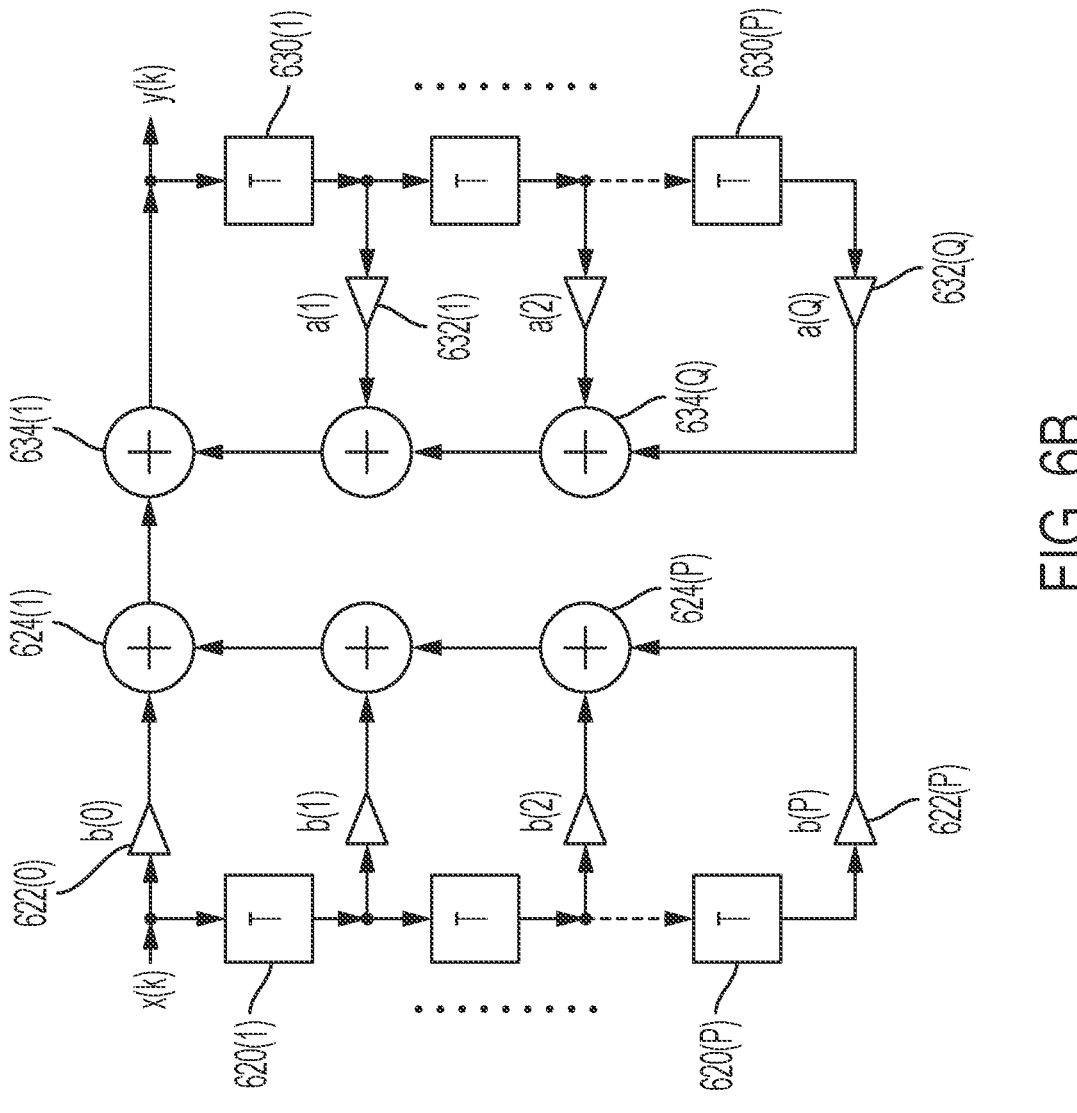
FIG. 6B is a block diagram of an IIR filter, in accordance with some embodiments.

FIG. 6B is a block diagram of an IIR filter 600B, in accordance with some embodiments.

IIR filter 600B is an embodiment of filter 310 of FIG. 3, and similar detailed description is therefore omitted. In some embodiments, the IIR filter 600B is usable as the filter 310 in the dispersion filter 300 of FIG. 3.

IIR filter 600B is configured to receive x[k] values of down-sampled signal DS (shown in FIG. 3), and to generate y[k] values of the filtered down-sampled signal FS (shown in FIG. 3).

IIR filter 600B includes P transformation elements 620(1), 620(2), . . . , 620(P) (hereinafter referred to as "set of transformation elements 620") coupled in series with each other.

IIR filter 600B further includes P+1 multiplier elements 622(0), 622(1), 622(2), . . . , 622(P) (hereinafter referred to as "set of multiplier elements 622"). Each multiplying element has a corresponding multiplier coefficient b(0), b(1), . . . , b(P). In some embodiments, each multiplier coefficient b(0), b(1), . . . , b(P) is the same as another multiplier coefficient. In some embodiments, at least one multiplier coefficient b(0), b(1), . . . , b(P) is different from another multiplier coefficient. In some embodiments, at least one or more multiplier coefficients b(0), b(1), . . . , b(P) change or are dynamic with respect to time.

IIR filter 600B further includes P summing elements 624(1), 624(2), . . . , 624(P) (hereinafter referred to as "set of summing elements 624") coupled in series with each other.

IIR filter 600B further includes Q summing elements 634(1), 634(2), . . . , 634(Q) (hereinafter referred to as "set of summing elements 634") coupled in series with each other. In some embodiments, integer P is equal to integer Q. In some embodiments, integer P is different from integer Q.

IIR filter 600B further includes Q+1 multiplier elements 632(0), 632(1), 632(2), . . . , 632(Q) (hereinafter referred to as "set of multiplier elements 632"). Each multiplying element has a corresponding multiplier coefficient b(0), b(1), . . . , b(Q). In some embodiments, each multiplier coefficient b(0), b(1), . . . , b(Q) is the same as another multiplier coefficient. In some embodiments, at least one multiplier coefficient b(0), b(1), . . . , b(Q) is different from another multiplier coefficient. In some embodiments, at least one or more multiplier coefficients b(0), b(1), . . . , b(Q) change or are dynamic with respect to time.

IIR filter 600B further includes Q transformation elements 630(1), 630(2), . . . , 630(Q) (hereinafter referred to as "set of transformation elements 630") coupled in series with each other.

The set of transformation elements 620 and 630, the set of multiplier elements 622 and 632 and the set of summing elements 624 and 634 are coupled together and generate the output signal y[k].

In some embodiments, at least the x[k] values, the coefficients a, the coefficients b or the y[k] values are complex numbers. In some embodiments, IIR filter 600B is complex.

In some embodiments, the IIR filter 600B includes coefficients, input data, and output data that are all complex values rather than real values. In some embodiments, at least the coefficients, input data, or output data of the IIR filter 600B are complex values.

Other filter types for IIR filter 600B are within the scope of the present disclosure. For example, IIR filter 600B is shown as an impulse invariant design, but in some embodiments, IIR filter 600B includes filter designs other than impulse invariant including at least bilinear transform design or step invariant design. In some embodiments, IIR filter 600B includes at least an FIR filter or an FFT filter.

Figure 6C:
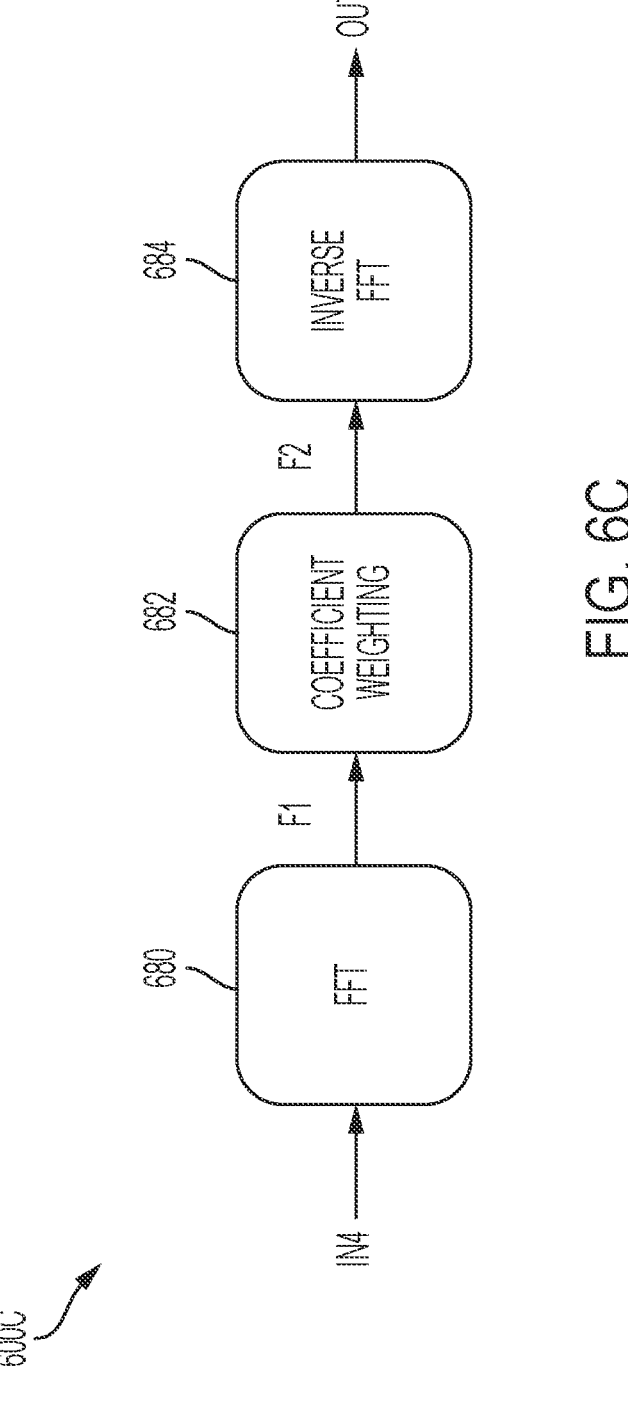
FIG. 6C is a block diagram of an FFT filter, in accordance with some embodiments.

FIG. 6C is a block diagram of an FFT filter 600C, in accordance with some embodiments.

FFT filter 600C is an embodiment of filter 310 of FIG. 3, and similar detailed description is therefore omitted. In some embodiments, the FFT filter 600C is usable as the filter 310 in the dispersion filter 300 of FIG. 3.

FFT filter 600C is configured to receive signal IN4, and to generate signal OUT4.

FFT filter 600C includes a circuit 680 configured to perform an FFT on a signal IN4 thereby generating an FFT signal F1. In some embodiments, signal IN4 corresponds to the down-sampled signal DS. In some embodiments, circuit 680 is a circuit, such as system 1600, configured to perform the FFT on signal IN4. In some embodiments, circuit 680 is a DSP, such as processor 1602 of FIG. 16, configured to perform the FFT on signal IN4.

FFT filter 600C further includes a circuit 682 coupled to an output of circuit 680. Circuit 682 is configured to add weighted filter coefficients to samples of the FFT signal F1 thereby generating a weighted FFT signal F2. In some embodiments, circuit 680 is a circuit, such as system 1600, configured to add weighted filter coefficients to samples of the FFT signal F1. In some embodiments, circuit 680 is a DSP, such as processor 1602 of FIG. 16, configured to add weighted filter coefficients to samples of the FFT signal F1.

FFT filter 600C further includes a circuit 684 coupled to an output of circuit 682. Circuit 684 is configured to perform an inverse FFT on the weighted FFT signal F2 thereby generating a signal OUT4. In some embodiments, signal OUT4 corresponds to the filtered down-sampled signal FS. In some embodiments, circuit 684 is a circuit, such as system 1600, configured to perform the inverse FFT on the weighted FFT signal F2. In some embodiments, circuit 684 is a DSP, such as processor 1602 of FIG. 16, configured to perform the inverse FFT on the weighted FFT signal F2.

In some embodiments, operation of the FFT filter 600C of FIG. 6C includes circuit 680 determining the fast Fourier transform (or discrete Fourier transform) of the complex input baseband signal (e.g., signal IN4). In some embodiments, the FFT or DFT algorithm performed by circuit 680 is complex. Afterwards, to obtain the desired frequency domain response, circuit 682 multiplies each Fourier coefficient by the desired frequency domain coefficient. Afterwards, circuit 684 performs an Inverse FFT to transform the signal F2 back to the time domain. In some embodiments, both the Fourier coefficients and the frequency domain response coefficients are complex values. In some embodiments, the DFT is performed instead of the FFT. In some embodiments, the inverse DFT is performed instead of the inverse FFT.

In some embodiments, FFT filtering is attractive for several reasons. In some embodiments, first, the Loran signal is already "windowed" in the time domain, and includes some discrete modulated pulses, with dead time before and after. In some embodiments, the signal is considered "repetitive" for Fourier purposes, with the repeat boundary points being set to zero. In some embodiments, second, FFT filtering allows a large amount of group delay variation. In some embodiments, phase shift between FFT bins is set up to 180 degrees. In some embodiments, the time delay dφ/dω, and therefore the group delay may have large variations between adjacent sets of FFT bins.

In some embodiments, in FIGS. 6A, 6B, and 6C described above, the filter coefficients of FIR filter 600A, IIR filter 600B or FFT filter 600C are constant over the duration of the pulse group. In some embodiments, at least filter 310 of FIG. 3, FIR filter 600A, IIR filter 600B or FFT filter 600C is time varying, and each of the coefficients of FIGS. 6A, 6B, and 6C described above changes with every new input sample. In some embodiments, the change in the coefficient values for each new input sample is relatively small so as not to cause extreme amounts of phase and/or amplitude modulation from sample to sample. In some embodiments, using time varying filters minimizes the disruption of the Loran spectral shape, and therefore modest changes to the coefficient values from sample to sample are implemented.

Other filter types for FFT filter 600C are within the scope of the present disclosure. For example, in some embodiments, FFT filter 600C includes at least an FIR filter or an IIR filter.

Figure 7A:
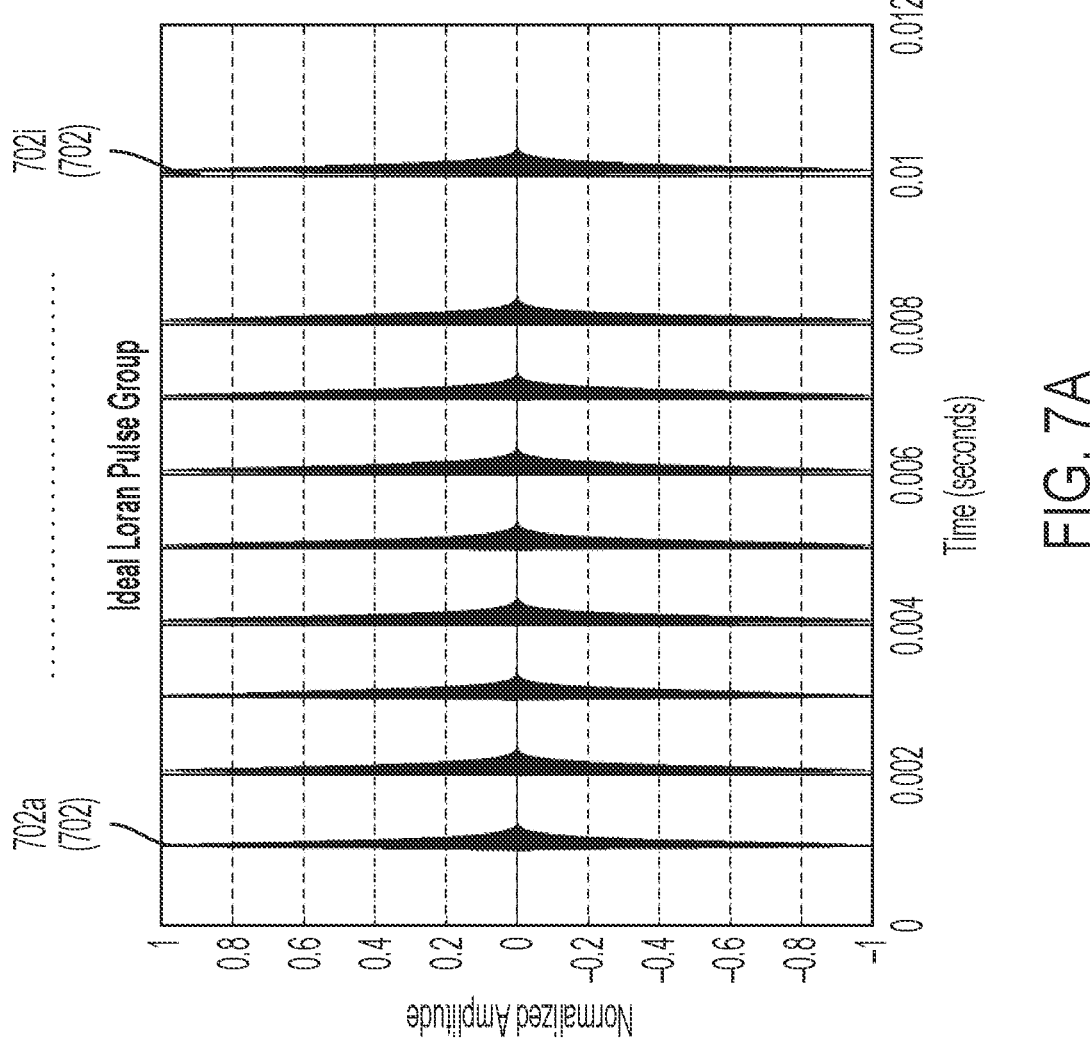
FIG. 7A is a waveform diagram of a Loran pulse group, in accordance with some embodiments.
Figure 7A:

FIG. 7A is a waveform diagram 700A of a Loran pulse group, in accordance with some embodiments.

In some embodiments, the waveform diagram 700A of FIG. 7A is a Loran pulse group generated by Loran pulse generator 102 and corresponds to the set of Loran signals LPO of FIG. 1 or signal IN1 of FIG. 3, similar detailed description is therefore omitted.

Waveform diagram 700A includes a series of Loran pulses 702a, 702b, . . . , 702i (collectively referred to as a "pulse group signal 702") spaced apart from each other along the x-axis. The x-axis of waveform diagram 700A corresponds to a time scale in seconds, and a y-axis of waveform diagram 700A corresponds to a normalized amplitude of the Loran pulse group.

In some embodiments, the waveform diagram 700A of FIG. 7A corresponds to an ideal Loran signal radiated by Loran transmitters of some approaches. In some embodiments, the pulse group signal 702 is transmitted by a master station. In some embodiments, the pulse group signal 702 is generated by a Loran transmitter. In some embodiments, the pulse group signal 702 is generated by other approaches. In some embodiments, the pulse group signal 702 includes eight equally spaced RF pulses (e.g., 702a, 702b, . . . , 702h), followed by an isolated ninth pulse (e.g., 702i) while the slave signals contain only eight pulses. In some embodiments, the peak to average power ratio for the pulse group signal is high, and is made even higher because there is a significant amount of dead time between each pulse of the pulse groups 702.

FIG. 7B is a waveform diagram 700B of a Loran pulse 709, in accordance with some embodiments.

In some embodiments, the waveform diagram 700B of FIG. 7B includes Loran pulse 709 that is generated by Loran pulse generator 102 and corresponds to the set of Loran signals LPO of FIG. 1 or signal IN1 of FIG. 3, similar detailed description is therefore omitted.

Loran pulse 709 corresponds to one of the Loran pulses 702a, 702b, . . . , 702i of the pulse group signal 702 of FIG. 7A and is zoomed in for illustration, and similar detailed description is therefore omitted.

Waveform diagram 700B includes Loran pulse 709. Loran pulse 709 includes an RF waveform 710 oscillating at a frequency, and an envelope function 712. In some embodiments, the RF waveform 710 oscillates at a frequency of 100 kHz. Other frequencies are within the scope of the present disclosure.

In some embodiments, the Loran pulse 709 is generated by the Loran pulse generator of FIG. 1, and is an ideal Loran pulse. In some embodiments, the Loran pulse of FIG. 7B is an ideal Loran pulse. In some embodiments, both the RF waveform 710 and the envelope function 712 are shown in FIG. 7B. In some embodiments, the Loran pulse has as fast a rise time as possible (leading envelope edge) while staying within the allocated bandwidth.

Figure 7C:
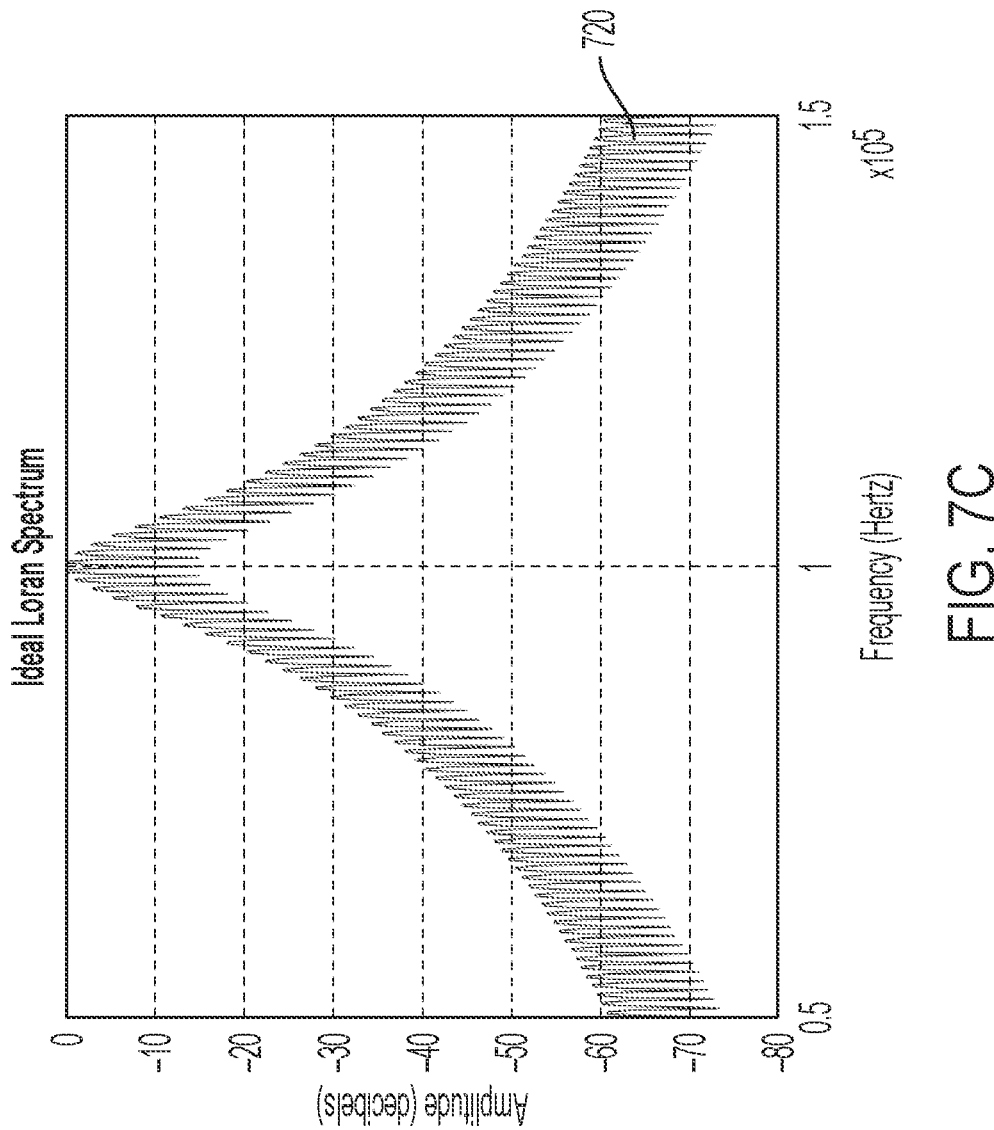
FIG. 7C is a waveform diagram of an RF power density spectrum of the pulse group signal, in accordance with some embodiments.
Figure 7C:

FIG. 7C is a waveform diagram 700C of an RF power density spectrum of the pulse group signal, in accordance with some embodiments.

In some embodiments, waveform diagram 700C corresponds to a frequency domain version of waveform 700A, and similar detailed description is therefore omitted. In some embodiments, the waveform diagram 700C of FIG. 7C is generated by Loran pulse generator 102 and corresponds to the set of Loran signals LPO of FIG. 1 or signal IN1 of FIG. 3.

Waveform diagram 700C includes an RF power density of the pulse group 720. The x-axis of waveform diagram 700C corresponds to a frequency scale in Hertz, and the y-axis of waveform diagram 700C corresponds to an amplitude of the Loran pulse group in decibels.

In some embodiments, the occupied bandwidth of the RF power density spectrum of waveform 700C is 20 kHz, and 99% of the signal power is contained within the occupied bandwidth. In some embodiments, additional signal power is positioned outside of the 20 kHz bandwidth, and should not be truncated. In some embodiments, at least 30 kHz of transmitter, antenna, and receiver bandwidth is used to maximize performance for transmitter 100A-100B.

Other configurations of transmitter 100A-100B or waveforms for waveforms 700A-700C are within the scope of the present disclosure.

Figure 8A:
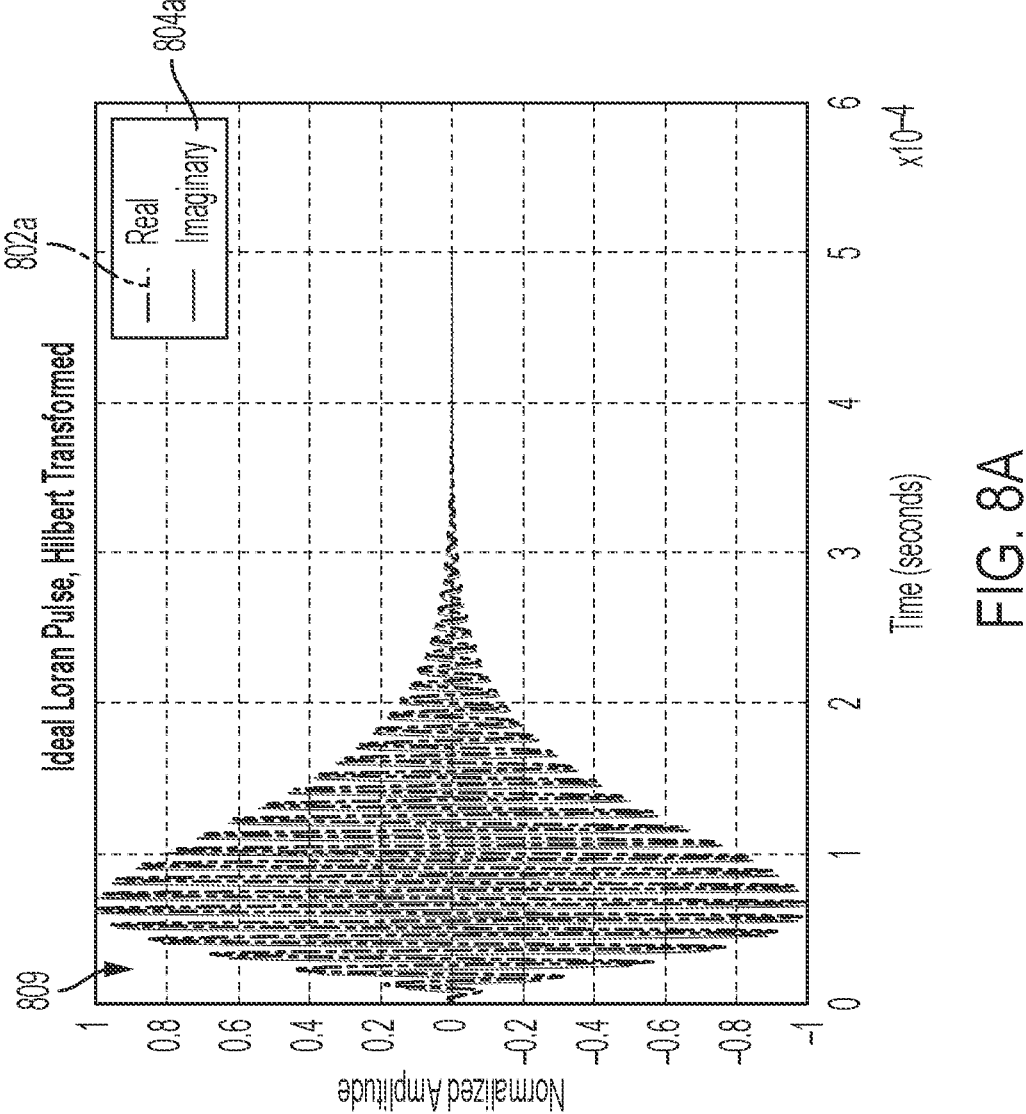
FIG. 8A is a waveform diagram of an output of the Hilbert transform device, in accordance with some embodiments.

FIG. 8A is a waveform diagram 800A of an output of the Hilbert transform device, in accordance with some embodiments.

In some embodiments, the waveform diagram 800A of FIG. 8A includes a Hilbert transformed Loran pulse 809 that is generated by Hilbert transform device 302 and corresponds to signal HT of FIG. 3, and similar detailed description is therefore omitted.

In some embodiments, Hilbert transformed Loran pulse 809 corresponds to one of the Loran pulses 702a, 702b, . . . , 702i of the pulse group signal 702 of FIG. 7A after being Hilbert transformed by Hilbert transform device 302, and similar detailed description is therefore omitted.

Waveform diagram 800A includes Hilbert transformed Loran pulse 809. Hilbert transformed Loran pulse 809 includes a real part 802a (e.g., I) and an imaginary part 804a (e.g., Q).

In some embodiments, the output of the Hilbert transform device 302 is an output of an ideal Loran pulse and corresponds to a complex signal. In some embodiments, the real part 802a of the Hilbert transformed signal 809 is similar to a Loran pulse of other approaches, and the imaginary part 804a of the Hilbert transformed signal 809 is an ideal envelope multiplied by a carrier signal having a phase shifted by 90 degrees. In some embodiments, the carrier signal has a phase shift different from 90 degrees.

FIG. 8B is a waveform diagram 800B of the Hilbert transformed signal after being down converted to zero frequency, in accordance with some embodiments.

In some embodiments, the waveform diagram 800B of FIG. 8B includes a baseband shifted Loran pulse 819 that is generated by multiplier 304 and corresponds to frequency shifted signal HTBB of FIG. 3, and similar detailed description is therefore omitted.

In some embodiments, baseband shifted Loran pulse 819 corresponds to Hilbert transformed Loran pulse 809 of FIG. 8A after being frequency shifted by multiplier 304, and similar detailed description is therefore omitted.

Waveform diagram 800B includes baseband shifted Loran pulse 819. Baseband shifted Loran pulse 819 includes a real part 802b (e.g., I) and an imaginary part 804b (e.g., Q). In some embodiments, the imaginary part 804b of the down converted signal of FIG. 8A is zero, and corresponds to the quadrature RF component of an ideal Loran pulse, which is also zero.

Other configurations of transmitter 100A-100B or dispersion filter 300 or waveforms for waveforms 800A-800B are within the scope of the present disclosure.

Figure 9:
FIG. 9 is a waveform diagram of an amplitude response and a group delay response of a dispersion filter, in accordance with some embodiments.

FIG. 9 is a waveform diagram 900 of an amplitude response and a group delay response of a dispersion filter, in accordance with some embodiments.

In some embodiments, waveform diagram 900 is an amplitude frequency response 902 and a group delay response 904 of dispersion filter 104, un-dispersion filter 204 or dispersion filter 300, and similar detailed description is therefore omitted.

In some embodiments, the amplitude response 902 and group delay response 904 of the dispersion filter of FIG. 9 is used by transmitter 100A-100B or receiver 200 to modify the Loran signal.

Waveform diagram 900 includes a frequency response amplitude response 902 and group delay response 904. The amplitude response 902 and group delay response 904 are also referred to as a frequency response of the dispersion filter. In some embodiments, the amplitude response 902 is flat over 100 kHz, and is wider than the Loran signal thereby causing the sideband amplitudes to be preserved, and thus the power spectral density remains the same. In some embodiments, the amplitude response is flat over other frequency ranges. In some embodiments, a slope of the group delay 904 is flat across the channel In some embodiments, a raised cosine group delay shape is applied, with lower sidebands encountering a smaller time delay and upper sidebands encountering a greater delay. In some embodiments, the delay variation is 4.5 milliseconds. In some embodiments, other delay variations are within scope of the present disclosure.

In some embodiments, other variations of the dispersion filter of FIG. 9 are within the scope of the present disclosure thereby changing the amplitude response 902 and group delay response 904. In some embodiments, the shape of the group delay 904 has odd symmetry. In some embodiments, the variation of the group delay 904 may be increased. In some embodiments, the variation of the group delay 904 may be decreased. In some embodiments, the shape of the group delay 904 has a different slope thereby causing more delay at the lower sideband than at the upper sideband, which would be the reverse of what is shown in FIG. 9. In some embodiments, the width of the raised cosine shape is different of what is shown in FIG. 9. In some embodiments, the shape of the filter response is different from raised cosine, and may include a constant slope. In some embodiments, the slope is not monotonic. In some embodiments, the filter response has multiple delay peaks.

In some embodiments, the amplitude function 902 is substantially flat and has unity gain so as not to disturb the spectral shape of the Loran signal. In some embodiments, the group delay 904 and phase function are altered thereby reducing the signal's peak envelope levels.

Figure 13:
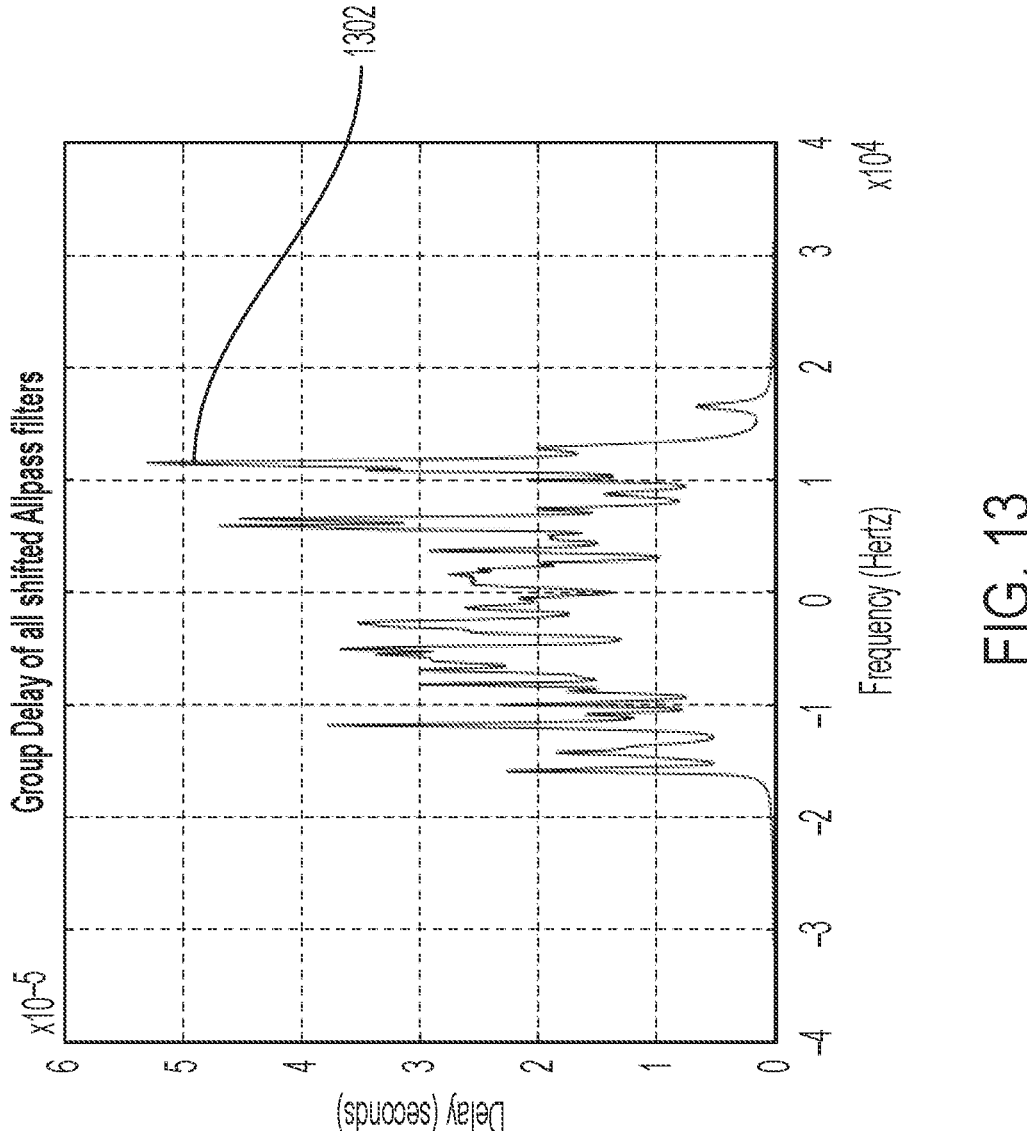
FIG. 13 is a waveform diagram of a group delay response of a dispersion filter, in accordance with some embodiments.
Figure 13:

In some embodiments, other variations of the dispersion filter response of FIG. 9 are within the scope of the present disclosure. For example, in some embodiments, the dispersion filter response of FIG. 9 uses a monotonically increasing group delay function for dispersion. This is similar to chirp radar, which effectively obtains a large pulse amplitude by smearing it out in time (and over frequency versus time) with a dispersion filter. In other words, FIG. 9 shows that the dispersion filter response is very much chirp-like, and looks like a frequency sweep. However, filter types other than chirp-like filters can produce similar results to the chirp-like filter. For example, yet another example of a filter response/group delay that can be used for the dispersion filter response of FIG. 9 is shown in FIG. 13 (below).

Other amplitude responses 902 or group delay responses 904 for dispersion filter 104, un-dispersion filter 204 or dispersion filter 300 or waveforms for waveform 900 are within the scope of the present disclosure.

Figure 10A:
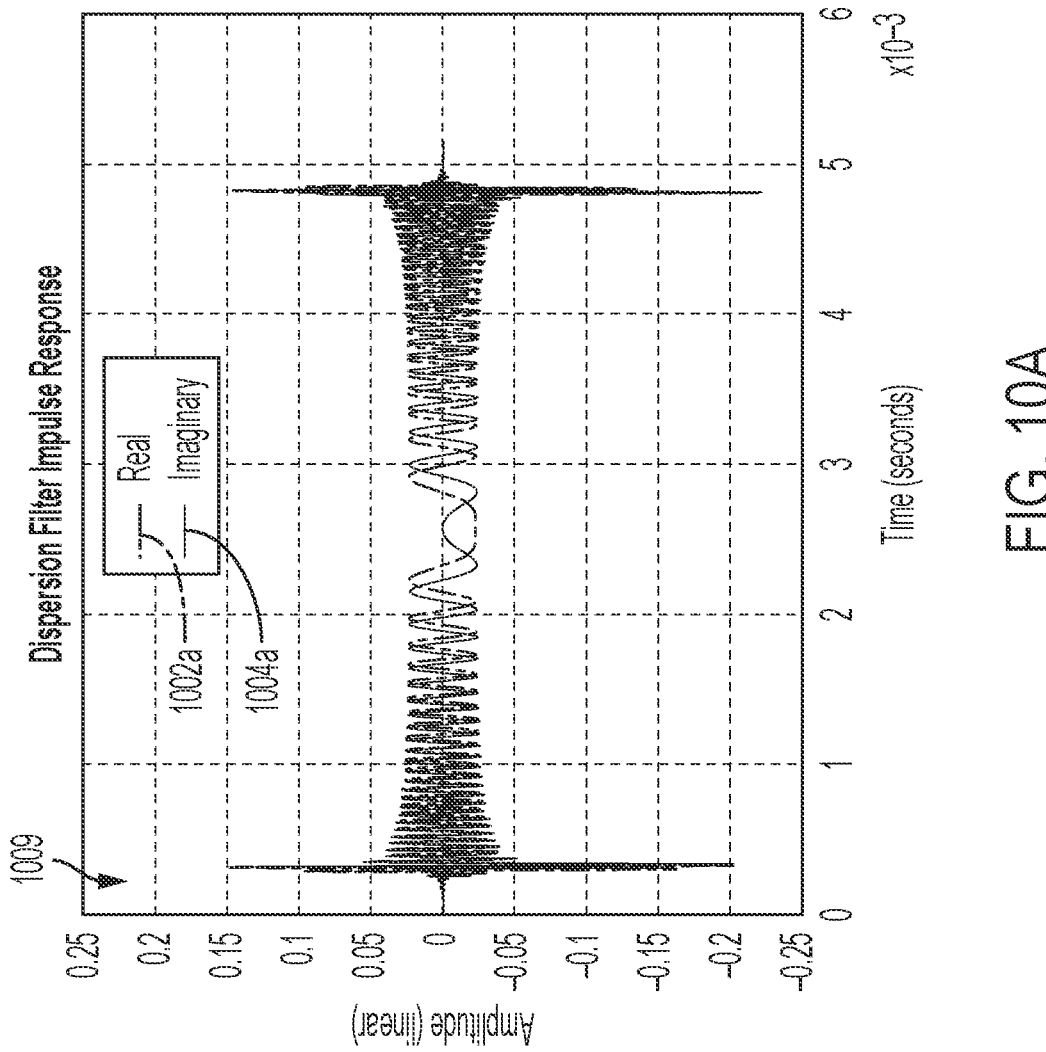
FIG. 10A is a waveform diagram of an impulse response of a FIR filter, in accordance with some embodiments.
Figure 10A:
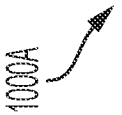

FIG. 10A is a waveform diagram 1000A of an impulse response 1009 of a FIR filter, in accordance with some embodiments.

In some embodiments, the impulse response 1009 of waveform diagram 1000A corresponds to the impulse response of dispersion filter 104, un-dispersion filter 204 or dispersion filter 300, and similar detailed description is therefore omitted. In some embodiments, impulse response 1009 corresponds to the impulse response of an FIR filter, such as FIR filter 600A, in dispersion filter 104, un-dispersion filter 204 or dispersion filter 300, and similar detailed description is therefore omitted.

Impulse response 1009 includes a real part 1002a (e.g., I) and an imaginary part 1004a (e.g., Q). In some embodiments, the impulse response 1009 of the FIR filter (e.g., FIR filter 600A) has the desired amplitude response 902 and group delay response 904 of FIG. 9. In some embodiments, the FIR filter (e.g., FIR filter 600A) is a complex filter operating on a complex time domain baseband signal centered at zero frequency. In some embodiments, the filter coefficients are complex. In some embodiments, other variations of the impulse response 1009 of the FIR filter, such as FIR filter 600A, in dispersion filter 104, un-dispersion filter 204 or dispersion filter 300 are within the scope of the present disclosure. In some embodiments, as the group delay or dispersion filter phase response is altered, the time domain impulse response (e.g., 1009) will change accordingly. In some embodiments, the FIR filter is implemented similar to that shown in FIG. 6A.

Other impulse responses 1009 for the FIR filter, such as FIR filter 600A, in dispersion filter 104, un-dispersion filter 204 or dispersion filter 300 or waveforms for waveform 1000A are within the scope of the present disclosure.

Figure 10B:
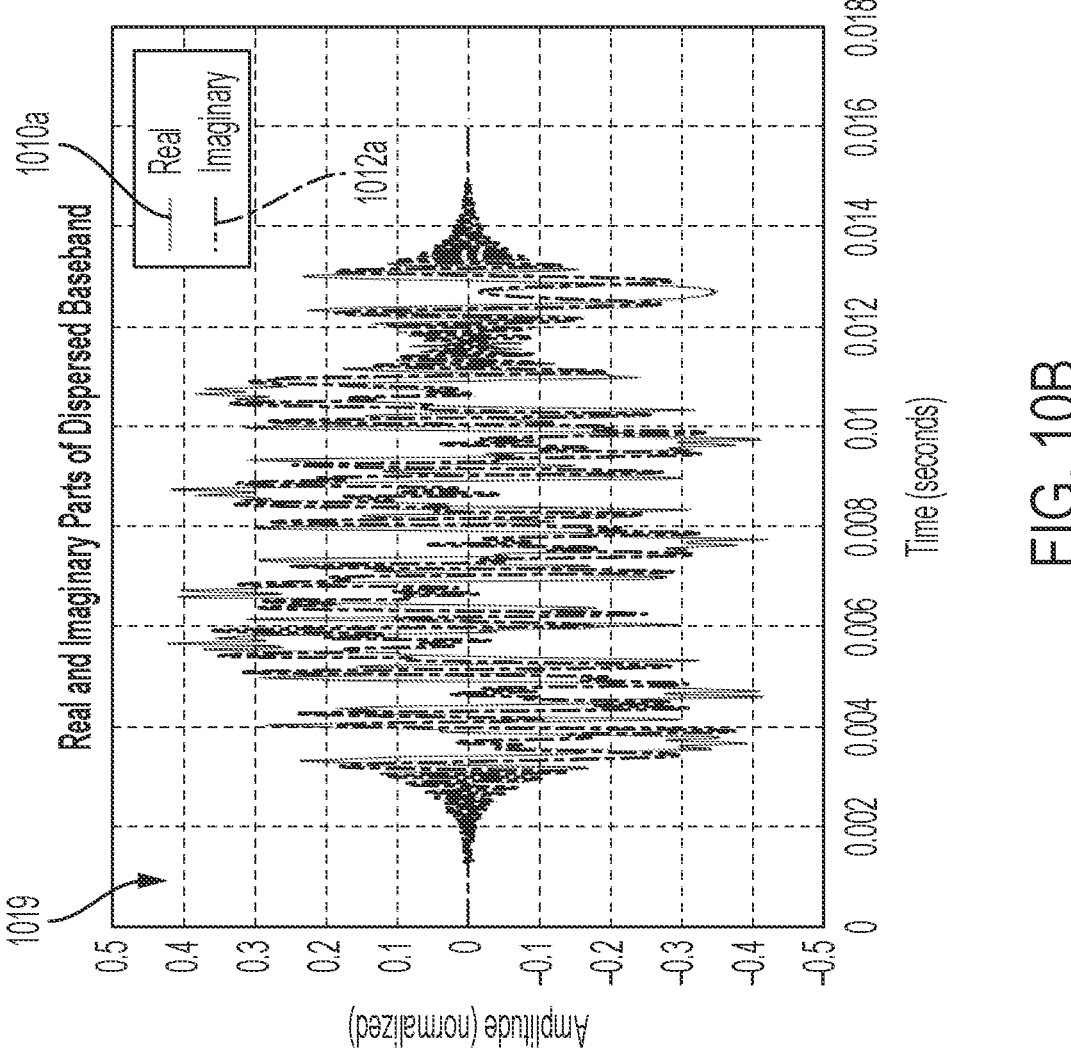
FIG. 10B is a waveform diagram of a baseband signal at the output of the dispersion filter of FIG. 3, in accordance with some embodiments.
Figure 10B:

FIG. 10B is a waveform diagram 1000B of a baseband signal 1019 at the output of the dispersion filter of FIG. 3, in accordance with some embodiments.

In some embodiments, the waveform diagram 1000B of FIG. 10B includes a filtered baseband signal 1019 that is generated by filter 310 and corresponds to the filtered down-sampled signal FS of FIG. 3, and similar detailed description is therefore omitted.

Waveform diagram 1000B includes filtered baseband signal 1019. Filtered baseband signal 1019 includes a real part 1012b (e.g., I) and an imaginary part 1014b (e.g., Q).

Other waveforms for waveform 1000B are within the scope of the present disclosure.

Figure 10C:
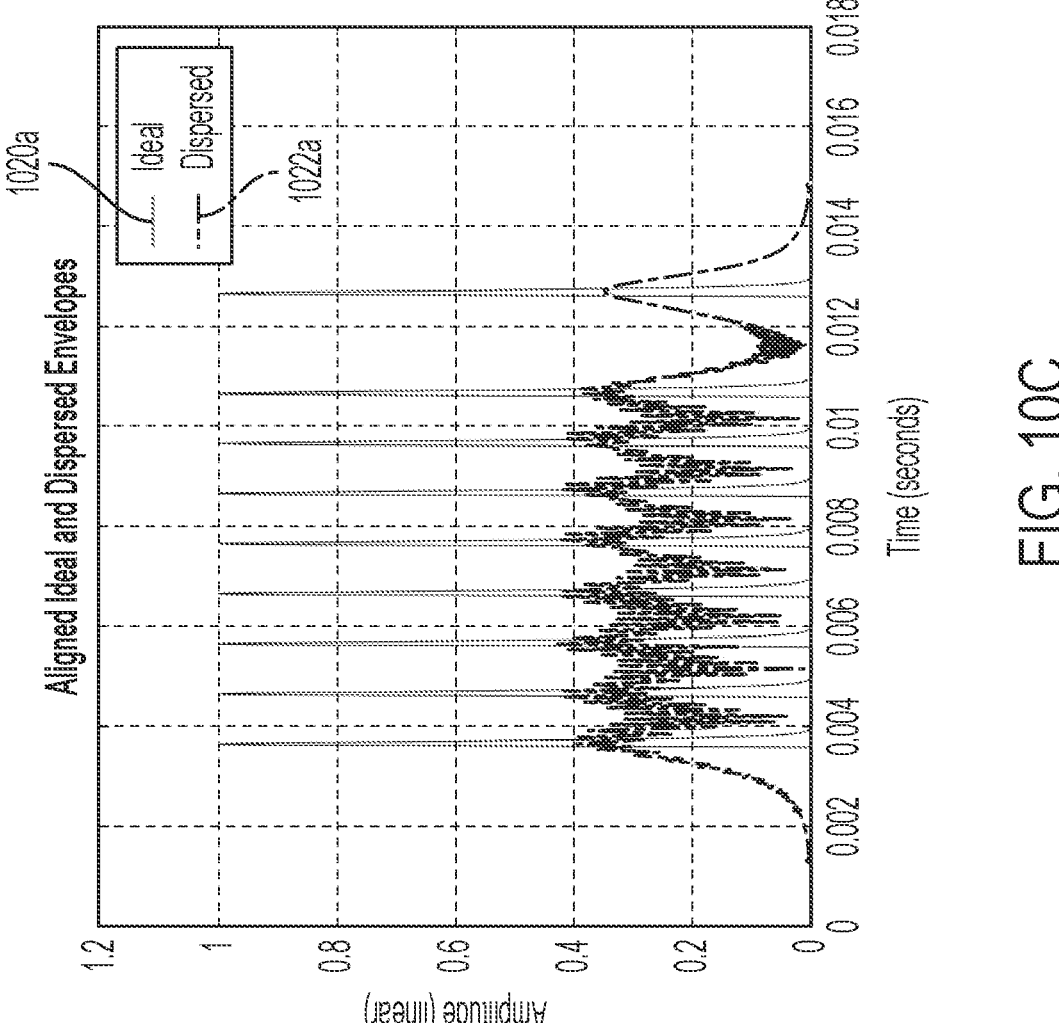
FIG. 10C is a waveform diagram of a dispersed Loran signal envelope and an ideal Loran signal envelope, in accordance with some embodiments.
Figure 10C:

FIG. 10C is a waveform diagram 1000C of a dispersed Loran signal envelope 1022a and an ideal Loran signal envelope 1020a, in accordance with some embodiments.

In some embodiments, the waveform diagram 1000C of FIG. 10C includes a dispersed Loran signal envelope 1022a and an ideal Loran signal envelope 1020a.

In some embodiments, dispersed Loran signal envelope 1022a is generated by filter 310 and corresponds to the filtered down-sampled signal FS of FIG. 3, and similar detailed description is therefore omitted.

In some embodiments, ideal Loran signal envelope 1020a is a Loran pulse group generated by Loran pulse generator 102 and corresponds to the set of Loran signals LPO of FIG. 1 or signal IN1 of FIG. 3, and similar detailed description is therefore omitted. In some embodiments, ideal Loran signal envelope 1020a corresponds to the positive values of waveform 700A, and similar detailed description is therefore omitted.

In some embodiments, the envelope of the dispersed Loran signal 1022a is shown after the signal has been passed through the dispersion filter 300 of FIG. 3. In some embodiments, the peak amplitude of the dispersed Loran signal 1022a is much lower than the peak amplitude of the ideal Loran signal 1020a. In some embodiments, the peak power of the dispersed Loran signal 1022a has been reduced by 7.37 decibels compared to the ideal Loran signal 1020a. In some embodiments, peak power of the dispersed Loran signal 1022a ranges from about 15-20 percent of the ideal Loran signal 1020a. In some embodiments, the average power of dispersed Loran signal 1022a and the ideal Loran signal 1020a are about the same. In some embodiments, the energy of the dispersed Loran signal 1022a is dispersed in time when compared with the ideal Loran signal 1020a, thereby keeping the average power for each of the dispersed Loran signal 1022a and the ideal Loran signal 1020a the same, but reducing the peaks of the dispersed Loran signal 1022a when compared with the ideal Loran signal 1020a.

Other waveforms for waveform 1000C are within the scope of the present disclosure.

FIG. 10D is an RF waveform diagram 1000D of a dispersed Loran pulse group 1030, in accordance with some embodiments.

In some embodiments, waveform diagram 1000D includes the dispersed Loran pulse group 1030, and is generated by interpolator 312 and corresponds to the filtered up-sampled signal IS of FIG. 3, and similar detailed description is therefore omitted.

In some embodiments, the dispersed Loran pulse group 1030 is an RF waveform and corresponds to the signal RX radiated by antenna 112 of FIG. 1, and similar detailed description is therefore omitted.

In some embodiments, the dispersed Loran pulse group 1030 has a center frequency of 100 kHz RF. In some embodiments, other center frequency values are within the scope of the present disclosure.

Other waveforms for waveform 1000D are within the scope of the present disclosure.

Figure 11A:
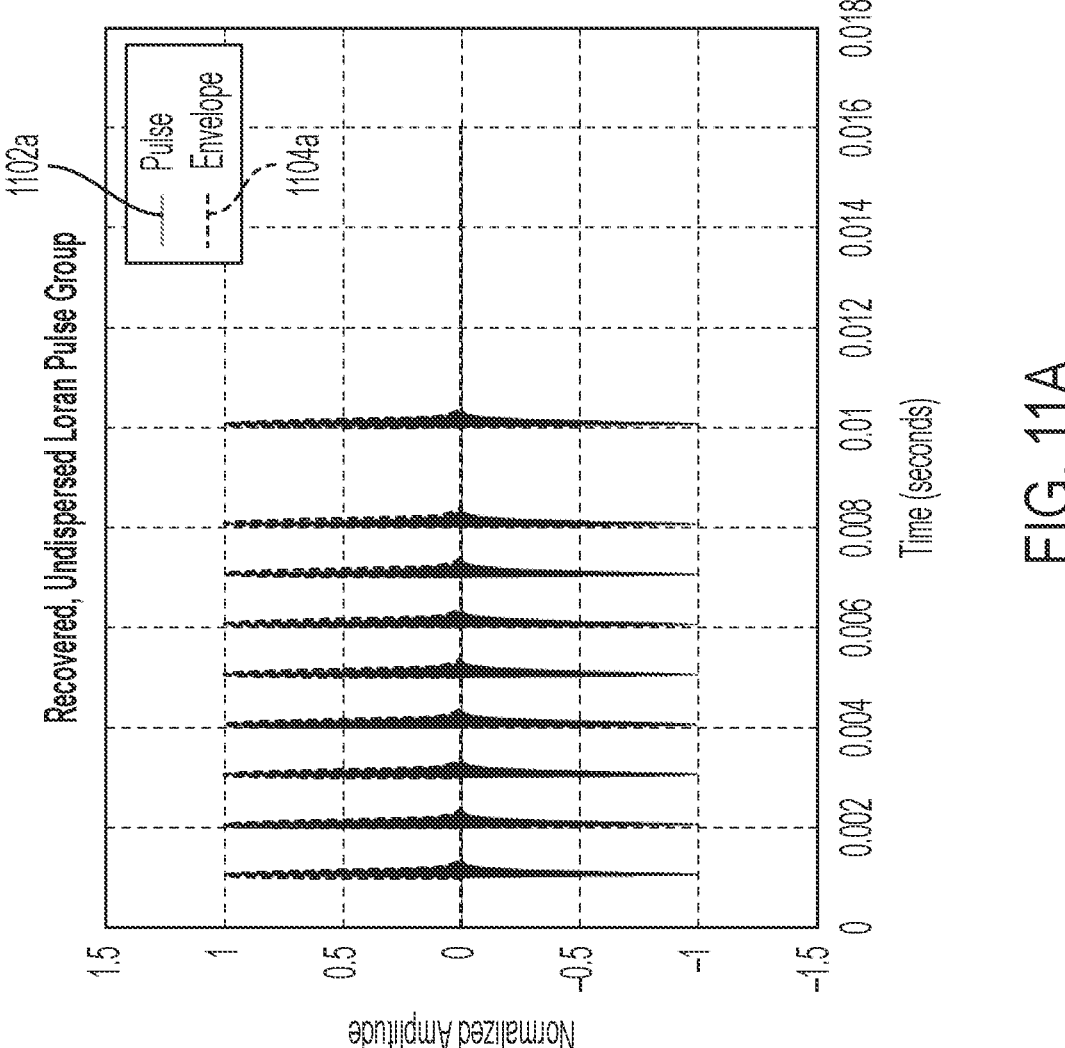
FIG. 11A is a waveform diagram of a pulse group signal and an envelope of the pulse group signal, in accordance with some embodiments.
Figure 11A:

FIG. 11A is a waveform diagram 1100A of a pulse group signal 1102a and an envelope 1104a of the pulse group signal, in accordance with some embodiments.

In some embodiments, the waveform diagram 1100A of FIG. 11A is a Loran pulse group 1102a and the corresponding envelope 1104a of the pulse group signal, and is generated by un-dispersion filter 204 in receiver 200 of FIG. 2 or signal IN1 of FIG. 3, and corresponds to signal LPIN in FIG. 2, and similar detailed description is therefore omitted.

Waveform diagram 1100A includes a Loran pulse group 1102a and a corresponding envelope 1104a of the pulse group 1102a. In some embodiments, waveform diagram 1100A is similar to waveform diagram 700A of FIG. 7A, and similar detailed description is therefore omitted.

In some embodiments, the un-dispersion filter 204 generates the waveform 1100A of FIG. 11A. In some embodiments, FIG. 11A shows the result of removing the pulse dispersion of FIG. 10D. In some embodiments, when the pulse dispersion has been removed by a complementary filter (e.g., un-dispersion filter 204), the pulses are accurately restored to their original appearance (e.g., FIG. 7A), and the Loran pulse signal is processed by the Loran receiver 206.

Other configurations of receiver 200 or other waveforms for waveform 1100A are within the scope of the present disclosure.

Figure 11B:
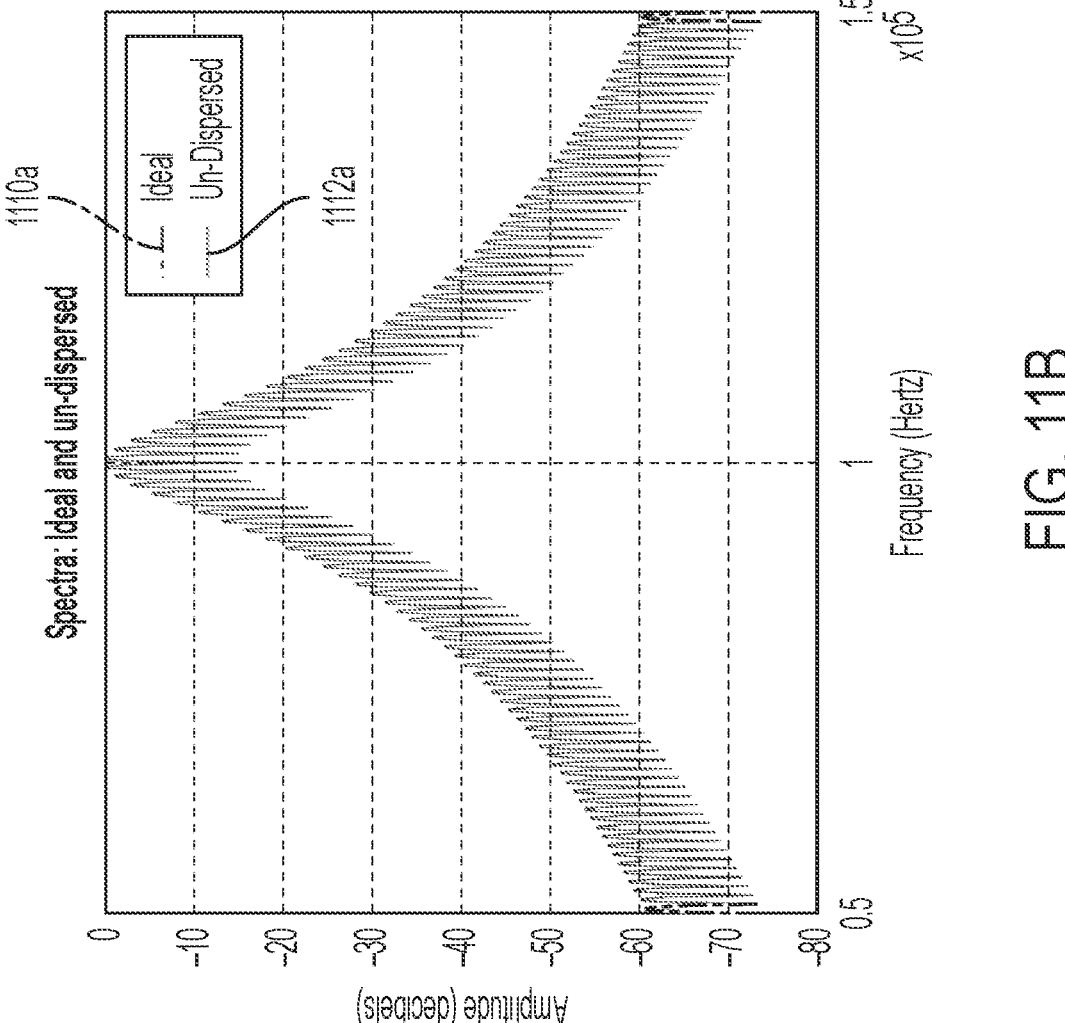
FIG. 11B is a waveform diagram of the power density spectra of the ideal, un-dispersed Loran signal and the recovered Loran signals, in accordance with some embodiments.
Figure 11B:
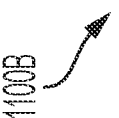

FIG. 11B is a waveform diagram 1100B of the power density spectra of the ideal, un-dispersed Loran signal 1110a and the recovered Loran signals 1112a, in accordance with some embodiments.

Waveform diagram 1100B includes a power density spectrum of the ideal, un-dispersed Loran signal 1110a and a power density spectrum of the recovered Loran signals 1112a.

In some embodiments, the power density spectrum of the ideal Loran signal 1110a corresponds to waveform 700C, and similar detailed description is therefore omitted.

In some embodiments, the power density spectrum of the recovered Loran signal 1112a corresponds to a frequency domain version of waveform 1100A, and similar detailed description is therefore omitted.

In some embodiments, waveform diagram 1100B corresponds to a comparison of waveform 700C (e.g., shown in FIG. 11B as curve 1110a) of FIG. 7c and curve 1112a, and similar detailed description is therefore omitted.

In some embodiments, the power density spectra of the ideal signal 1110a and the recovered, un-dispersed Loran signal 1112a are very similar.

Other waveforms for waveform 1100B are within the scope of the present disclosure.

Figure 12:
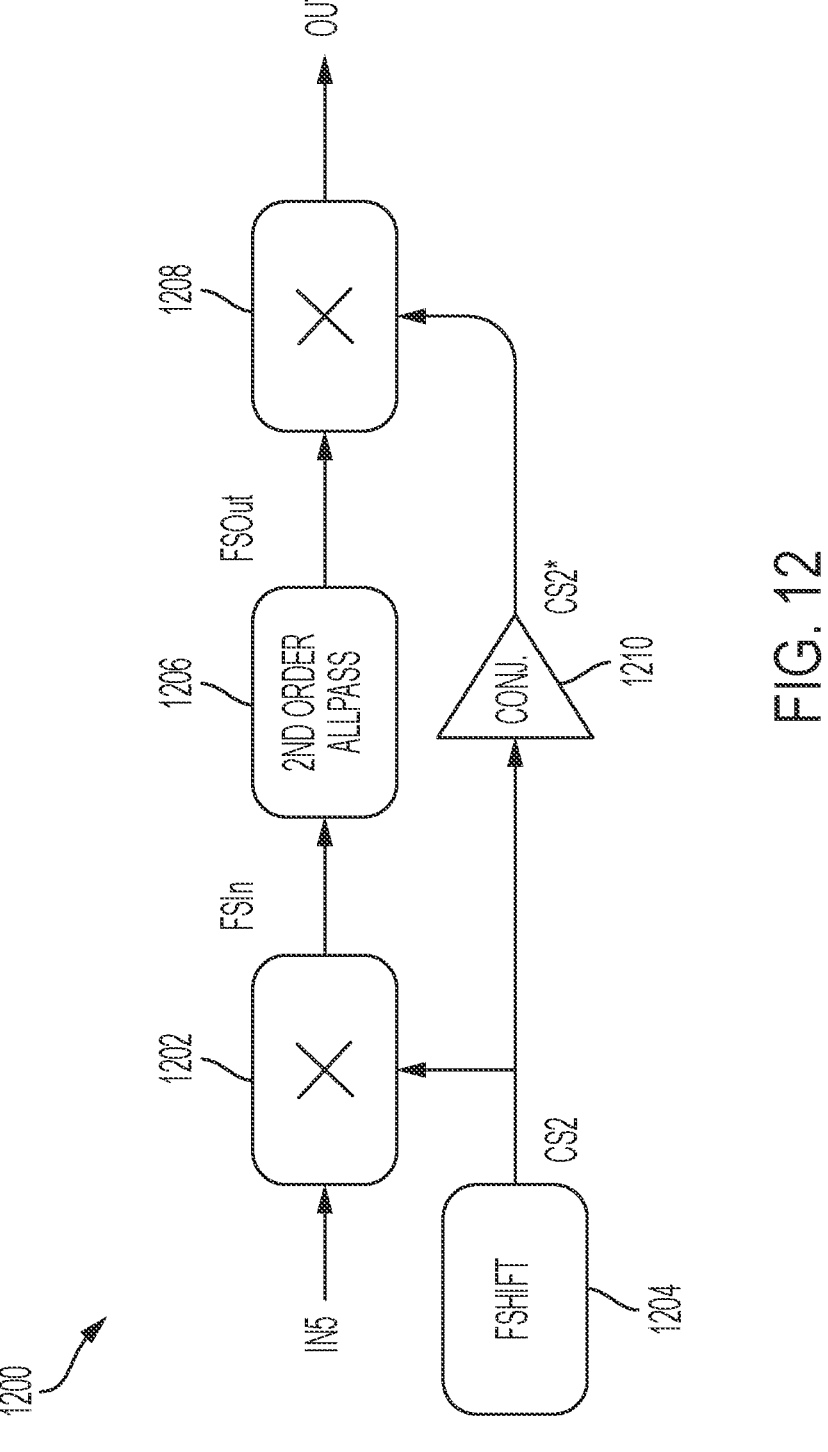
FIG. 12 is a block diagram of an all-pass filter, in accordance with some embodiments.

FIG. 12 is a block diagram of an all-pass filter 1200, in accordance with some embodiments.

In some embodiments, the IIR all-pass filter 1200 is a randomly-generated IIR filter.

IIR all-pass filter 1200 is configured to receive a signal IN5, and to generate a signal OUT5. Signal IN5 of FIG. 12 corresponds to down-sampled signal DS of FIG. 3, and signal OUT5 corresponds to filtered down-sampled signal FS of FIG. 3, and similar detailed description is therefore omitted.

All-pass filter 1200 includes a multiplier 1202 that is coupled to a carrier generator 1204.

Multiplier 1202 is configured to generate a frequency shifted signal FSIN in response to at least a carrier signal CS2 and signal IN5. In some embodiments, the frequency shifted signal FSIN corresponds to signal IN5 shifted to a frequency F1. In some embodiments, frequency F1 is a positive frequency. In some embodiments, frequency F1 is a negative frequency. In some embodiments, F1 corresponds to a frequency offset of −10 kHz to +10 kHz from the 100 kHz center frequency, to distribute one or more allpass functions over the bandwidth of the Loran signal.

Carrier generator 1204 is coupled to multiplier 1202 and a circuit 1210. Carrier generator 1204 is configured to generate carrier signal CS2. In some embodiments, a frequency of the carrier signal CS2 is F1. In some embodiments, the carrier signal CS2 is a complex sinusoid (e.g., sine wave and cosine wave) with a carrier frequency at F1. Other carrier frequencies for carrier signal CS2 are within the scope of the present disclosure. In some embodiments, the real component and the complex component of the carrier signal CS2 is a continuous wave signal having a similar fundamental frequency.

All-pass filter 1200 further includes a second order all-pass filter 1206 coupled to an output of the multiplier 1202. The second order all-pass filter 1206 is configured to generate a filtered signal FSOUT in response to signal FSIN. In some embodiments, second order all-pass filter 1206 corresponds to a randomly generated real coefficient second order IIR all-pass filter. Other filter types or filter order types for second order all-pass filter 1206 are within the scope of the present disclosure.

All-pass filter 1200 further includes a multiplier 1208 coupled to an output of second order all-pass filter 1206. Multiplier 1208 is configured to generate a signal OUT5 in response to at least a carrier signal CS2* and signal FSOUT. In some embodiments, signal OUT5 is frequency shifted signal FSOUT shifted by frequency F1 back to baseband. In some embodiments, signal OUT5 corresponds to signal IN5 filtered. In some embodiments, frequency shifted signal FSOUT is multiplied by the conjugate (e.g., CS2*) of the complex sinusoid, thereby shifting the center frequency back to baseband.

All-pass filter 1200 further includes a circuit 1210. Circuit 1210 is coupled to carrier generator 1204 and multiplier 1208. Circuit 1210 is configured to generate carrier signal CS2*. In some embodiments, circuit 1210 is configured to generate a conjugate of carrier signal CS2 by shifting the sign of the imaginary portion of carrier signal CS2. In some embodiments, circuit 1210 is a circuit, such as system 1600, configured to perform conjugation of carrier signal CS2. In some embodiments, circuit 1210 is a DSP, such as processor 1602 of FIG. 16, configured to perform conjugation of carrier signal CS2.

A non-limiting operation of all-pass filter 1200 includes: In some embodiments, a real-coefficient, complex data IIR all-pass filter is used for second order all-pass filter 1206, and incoming complex data (e.g., signal IN5) is frequency-shifted by multiplier 1202. Afterwards, in these embodiments, the frequency shifted complex data (signal FSIN) is input into the real-coefficient all-pass filter (e.g., second order all-pass filter 1206). Afterwards, in these embodiments, the frequency of the complex signal data (e.g., signal FSOUT) is un-shifted by multiplier 1208, restoring the signal (e.g., signal OUT5) to its original frequency. In some embodiments, the operation of all-pass filter 1200 is similar to randomly shifting the all-pass filters up and down in frequency. In some embodiments, the frequency shift is random, and varies from −10 kHz to +10 kHz. Other frequency ranges are within the scope of the present disclosure.

In some embodiments, a number of randomly-generated IIR all-pass filters, similar to all pass filter 1200, can be used to generate a number of filter pairs that can be used for a robust encrypted system.

Other configurations of all-pass filter 1200 or other numbers of components are within the scope of the present disclosure.

FIG. 13 is a waveform diagram 1300 of a group delay response 1302 of a dispersion filter, in accordance with some embodiments.

Waveform diagram 1300 includes group delay response 1302. In some embodiments, the group delay response 1302 corresponds to the group delay response of a randomly-generated IIR all-pass filter, such as all-pass filter 1200 of FIG. 12. For example, in some embodiments, the waveform 1300 of FIG. 13 is generated by randomly-generated IIR all-pass filters having the group delay response 1302 of FIG. 13.

In some embodiments, the group delay response 1302 of FIG. 13 is generated by a number of randomly-generated IIR all-pass filters, such as all-pass filter 1200 of FIG. 12, connected in cascade. In some embodiments, the number is 48 randomly-generated IIR all-pass filters. Other numbers are within the scope of the present disclosure.

In some embodiments, the frequency response of the randomly-generated IIR all-pass filters, such as all-pass filter 1200 of FIG. 12, is a complex response. In other words, different responses result for positive frequencies and negative frequencies.

In some embodiments, the group delay response 1302 of FIG. 13 is generated by 48 versions of the all-pass filter 1200 of FIG. 12 connected in cascade with randomly chosen pole/zero locations, and 48 different random frequency shifts. Other pole/zero locations and frequency shifts are within the scope of the present disclosure.

In some embodiments, the number of randomly-generated IIR all-pass filters similar to FIG. 12 can be used to generate numerous filter pairs, and a robust encrypted system. In some embodiments, 48 cascaded filters results in 144 different values for each filter pair (e.g., two all-pass filter values and one frequency shift value) resulting in a very large "encryption key." For example, in some embodiments, the randomly-generated IIR all-pass filters, such as all-pass filter 1200 can be used in both the transmitter 100A-100B and in the receiver 200. In these embodiments, the randomly-generated IIR all-pass filters can be changed in both the transmitter 100A-100B and in the receiver 200 in a synchronized manner based on various parameters. For example, in some embodiments, the randomly-generated IIR all-pass filters can be stored in a "library" that is stored in transmitter 100A-100B and each receiver 200. In some embodiments, the library is preset. In some embodiments, the library is updated and can be reconfigured by a user. In some embodiments, if the system (transmitter 100A-100B and receiver 200) is used for encryption, then the "library" contents would be secret from non-authorized users or entities. In some embodiments, the Loran Data Channel (LDC) would instruct the receivers 200 which all-pass filters to use, or they could be selected based on time of day.

Other configurations of transmitter 100A-100B or receiver 200 or other waveforms for waveform 1300 are within the scope of the present disclosure.

Figure 14:
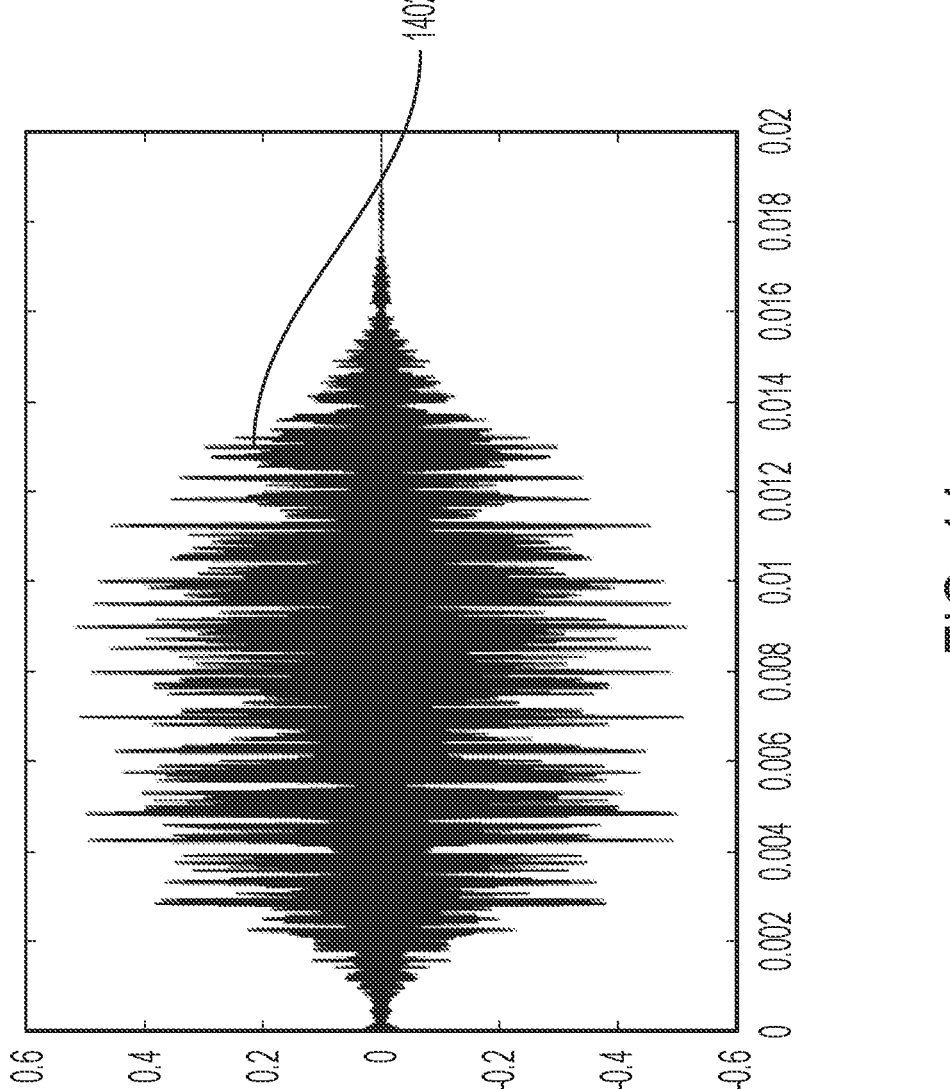
FIG. 14 is a waveform diagram of a Loran pulse group with random all-pass dispersion, in accordance with some embodiments.
Figure 14:
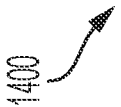

FIG. 14 is a waveform diagram 1400 of a Loran pulse group 1402 with random all-pass dispersion, in accordance with some embodiments.

Waveform diagram 1400 includes Loran pulse group 1402. In some embodiments, the pulse group 1402 corresponds to a Loran pulse after being passed through a set of IIR all-pass filters, such as all-pass filter 1200 of FIG. 12. The Loran pulse group 1402 is dispersed as shown in FIG. 14. In some embodiments, as was the case with the FIR dispersion filter described above, this signal when conjugated and filtered in reverse time by the all-pass filter in the receiver accurately restores the original Loran pulses.

Other waveforms for waveform 1400 are within the scope of the present disclosure.

Figure 15:
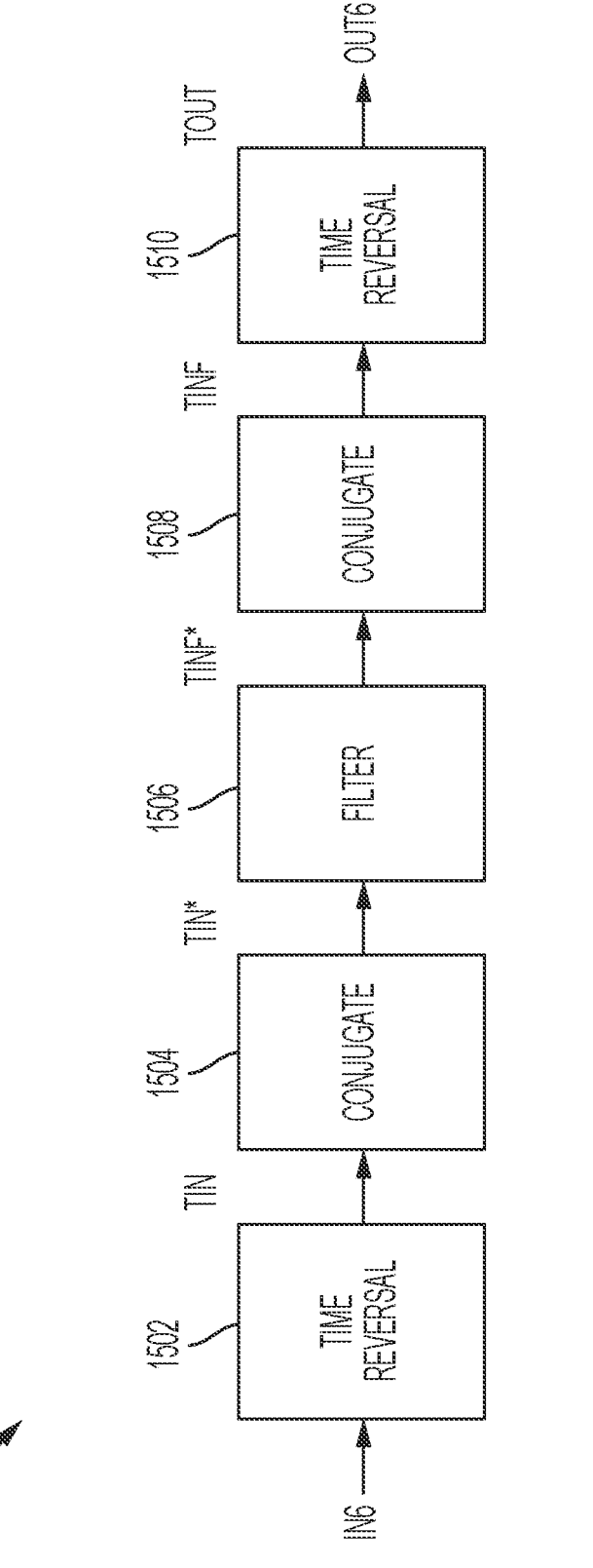
FIG. 15 is a diagram of a time reversed filter, in accordance with some embodiments.

FIG. 15 is a diagram of a time reversed filter 1500, in accordance with some embodiments.

In some embodiments, the time reversed filter 1500 is useable as filter 310 of the dispersion filter 300.

The signal IN6 of FIG. 15 corresponds to the down-sampled signal DS of FIG. 3. The signal OUT6 of FIG. 15 corresponds to the filtered down-sampled signal FS of FIG. 3.

The time reversed filter 1500 includes a time reversal circuit 1502 configured to generate a time-reversed signal TIN responsive to a signal IN6. In some embodiments, signal IN6 corresponds to the down-sampled signal DS. In some embodiments, time reversal circuit 1502 is a circuit, such as system 1600, configured to perform time reversal of signal IN6. In some embodiments, time reversal circuit 1502 is a DSP, such as processor 1602 of FIG. 16, configured to perform time reversal of signal IN6.

The time reversed filter 1500 further includes a circuit 1504 coupled to an output of the time reversal circuit 1502. The circuit 1504 is configured to generate a conjugate of the time-reversed signal TIN* responsive to the time-reversed signal TIN. In some embodiments, circuit 1504 is a circuit, such as system 1600, configured to perform conjugation of the time-reversed signal TIN. In some embodiments, circuit 1504 is a DSP, such as processor 1602 of FIG. 16, configured to perform conjugation of the time-reversed signal TIN.

The time reversed filter 1500 further includes a filter 1506 coupled to an output of the circuit 1504. The filter 1506 is configured to filter the conjugate of the time-reversed signal TIN* thereby generating a filtered first signal TINF*.

The time reversed filter 1500 further includes a circuit 1508 coupled to an output of the filter 1506. The circuit 1508 is configured to generate a conjugate of the filtered first signal TINF responsive to the filtered first signal TINF*. In some embodiments, circuit 1508 is a circuit, such as system 1600, configured to perform conjugation of the filtered first signal TINF*. In some embodiments, circuit 1508 is a DSP, such as processor 1602 of FIG. 16, configured to perform conjugation of the filtered first signal TINF*.

The time reversed filter 1500 further includes a time reversal circuit 1510 coupled to an output of the circuit 1508. The time reversal circuit 1510 is configured to generate a time-reversed signal TOUT responsive to the conjugate of the filtered first signal TINF. In some embodiments, the time-reversed signal TOUT corresponds to the filtered down-sampled signal FS or signal OUT6. In some embodiments, time reversal circuit 1510 is a circuit, such as system 1600, configured to perform time reversal of the conjugate of the filtered first signal TINF. In some embodiments, time reversal circuit 1510 is a DSP, such as processor 1602 of FIG. 16, configured to perform time reversal of the conjugate of the filtered first signal TINF.

In some embodiments, the time reversed filter 1500 is usable in the un-dispersion filter 204 of FIG. 2. In some embodiments, the time reversed filter 1500 is usable in the dispersion filter 104 of FIG. 1.

In some embodiments, rather than generating separate complementary filters for transmission and reception, the same filter is used for both functions. In some embodiments, in either the transmitter 100A-100B or the receiver 200, the signal is reversed in time, conjugated, and passed through the filter 1506, then conjugated and time-reversed again to restore it to its original order. For example, time reversal inverts the spectrum of a complex time domain signal, hence the conjugation is performed to un-do the inversion of the spectrum. In some embodiments, reversing the time order causes filter 1506 to invert its group delay characteristic which is used to remove the signal dispersion.

In some embodiments, time reversed filtering is used to apply or remove signal dispersion. In some embodiments, signal dispersion is achieved with complementary or matched filters. In some embodiments, the time reversal method uses IIR all-pass filters, such as IIR all-pass filter 1200, for signal dispersion.

In some embodiments, the time-reversal, conjugation, filtering, conjugation, and time-restoration is performed in transmitter 100A-100B. In some embodiments, since there are more receivers than transmitters (e.g., 100A-100B), the receivers 200 perform the pulse un-dispersion in forward time. In some embodiments, the time-reversal, conjugation, filtering, conjugation, and time-restoration is performed in the receivers 200.

In some embodiments, a dispersed pulse Loran system of the present disclosure results in a large increase in power capability for a given peak envelope power. In some embodiments, a transmitter capable of 100 kW (PEP) of Loran of other approaches is capable in the present disclosure over an effective 500 kW of pulse-dispersed Loran. In some embodiments, if no effective power increase is used, then the benefits apply to reduced antenna voltage stress and a 100 kW PEP Loran signal could be radiated in dispersed form at an actual PEP of 20 kW.

Antennas for Loran are electrically short. A wavelength at 100 kHz is 3000 meters. A full size quarter wave resonant antenna would therefore be 750 meters tall. Loran antennas are short monopoles with capacitive top loading. Short monopoles when impedance matched have a narrower bandwidth than a full size quarter wave monopole. Although the occupied bandwidth of a Loran signal (wherein 99% of the power exists) is 20 kHz, radiating a 30 kHz bandwidth results in better system performance, but the percent bandwidth of a Loran signal is 30% (30 kHz/100 kHz). This in turn places voltage stress on the antenna and the bushing (insulator) between the tower and the helix house. For sufficient system performance, this voltage is kept below 250 kV. In some embodiments, by reducing the peak envelope amplitude of the Loran signal, the voltage stress is reduced. In some embodiments, for the same antenna voltage, the tower height and land requirements are reduced. In some embodiments, the increase in effective power causes increased range and SNR. In some embodiments, the increase in effective power causes lower power transmitters, with shorter antenna towers, reduced antenna voltage, and reduced land requirements.

In some embodiments, the increase in effective power allows increased Loran Data Channel (LDC) payload. With better SNR for the position, navigation, and timing (PNT) part of the signal, more "air time" can be allocated to the LDC in the present disclosure. For example, in some embodiments, the LDC is a BPSK modulated digital signal. In some embodiments, for some proportion of the time, dispersed Loran pulses are transmitted, and for the rest of the time, a completely different, high-capacity Loran data channel is transmitted. In some embodiments, to obtain the highest transmitted power with an electrically short antenna, the spectrum of the LDC is similar to that of the Loran signal, e.g., a "haystack" shape. In some embodiments, power decreases as frequencies move away from channel center thereby suggesting the use of at least BPSK, QAM, MSK, GMSK signals or the like for the LDC.

In some embodiments, selective availability is used by changing the dispersion filters rapidly in a secret sequence with secret filter coefficients thereby denying public use of the signal, while still providing service to authorized users.

In some embodiments, the increase in effective power causes possible mitigation of impulse noise interference. In some embodiments, when the dispersed Loran signal is passed through the complementary receiver dispersion filter of the present disclosure, that complementary receiver dispersion filter will have the effect of dispersing impulse noise. In some embodiments, although the noise power will not be changed, the impulsive characteristic of the noise will be changed. In some embodiments, the peak amplitude of impulse noise is reduced since it is dispersed in the time domain.

In some embodiments, pulse dispersion does not affect the bandwidth or power spectral density of the Loran signal. In some embodiments, the 100 kHz allocation for Loran signals will not be affected. In some embodiments, the dispersed Loran pulse signal has the same bandwidth and spectral shape as Loran pulses. In some embodiments, if a different modulation format for LDC is used, the LDC should have a haystack spectral shape similar to that of the Loran signal. In some embodiments, MSK, GMSK, QAM, and BPSK can be used in the LDC.

In some embodiments, existing techniques of other approaches can be used to receive Loran signals. In some embodiments, techniques for discriminating against skywave reflections will continue to work. In some embodiments, as soon as the received signal passes through the linear un-dispersion filter, Loran pulses are reconstructed and the signal is processed and received as if it were a Loran signal of other approaches.

In some embodiments, applying pulse dispersion to Loran or eLoran upgrades the system significantly to make best use of modern technology. In some embodiments, with solid state transmitters it is equivalent to radiating over 5 times the power compared to Loran of other approaches thereby allowing the allocation of time slots for a dedicated LDC signal. In some embodiments, the modernized pulse-dispersed signal exploits modern and inexpensive digital signal processing techniques, and can be used with techniques of other approaches that separate skywave and groundwave components of Loran C signals, and are still valid and can be fully exploited in modernized receivers.

Figure 16:
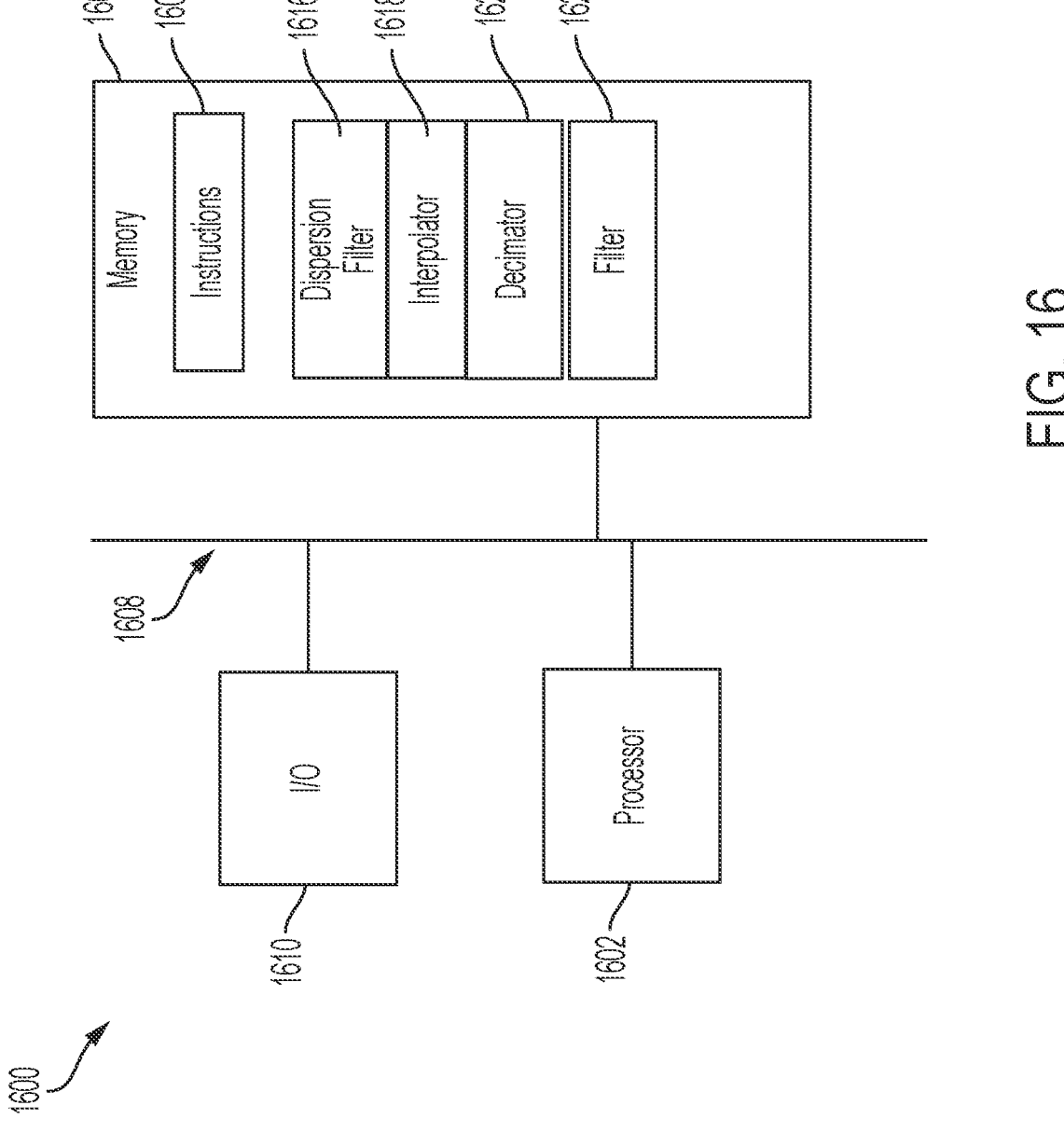
FIG. 16 is a schematic view of a controller usable in one or more of the transmitter of FIGS. 1A-1B, or the receiver of FIG. 2, in accordance with some embodiments.

FIG. 16 is a schematic view of a controller 1600 usable in one or more of the transmitter 100A-100B of FIGS. 1A-1B, or the receiver 200 of FIG. 2, in accordance with some embodiments.

In some embodiments, controller 1600 is usable as at least the transmitter 100A-100B of FIG. 1, the receiver 200 of FIG. 2, dispersion filter 300 of FIG. 3, decimator 400 of FIG. 4, interpolator 500, FIR filter 600A of FIG. 6A, IIR filter 600B of FIG. 6B, FFT filter 600C of FIG. 6C, all-pass filter 1200 of FIG. 12, time reversed filter 1500 of FIG. 15, or one or more circuits or components in FIGS. 1A-1B, 2-5, 6A-6C, 7A-7C, 8A-8B, 9, 10A-10D, 11A-11B and 12-16.

Controller 1600 includes a hardware processor 1602 and a non-transitory, computer readable storage medium 1604 encoded with, i.e., storing, the computer program code 1606, i.e., a set of executable instructions. Computer readable storage medium 1604 is also encoded with instructions 1607 for interfacing with at least one or more of the transmitter 100A-100B of FIGS. 1A-1B, or the receiver 200 of FIG. 2. The processor 1602 is electrically coupled to the computer readable storage medium 1604 by a bus 1608. The processor 1602 is also electrically coupled to an I/O interface 1610 by bus 1608. A network interface 1612 is also electrically connected to the processor 1602 by bus 1608. Network interface 1612 is connected to a network 1614, so that processor 1602 and computer readable storage medium 1604 are capable of connecting to external elements via network 1614. The processor 1602 is configured to execute the computer program code 1606 encoded in the computer readable storage medium 1604 in order to cause controller 1600 to be usable for performing a portion or all of the operations of the figures of the present disclosure.

In some embodiments, the processor 1602 is a central processing unit (CPU), a multi-processor, a distributed processing system, an application specific integrated circuit (ASIC), and/or a suitable processing unit.

In some embodiments, the computer readable storage medium 1604 is an electronic, magnetic, optical, electromagnetic, infrared, and/or a semiconductor system (or apparatus or device). For example, the computer readable storage medium 1604 includes a semiconductor or solid-state memory, a magnetic tape, a removable computer diskette, a random access memory (RAM), flash memory including flash RAM, a read-only memory (ROM), a rigid magnetic disk, and/or an optical disk. In some embodiments using optical disks, the computer readable storage medium 1604 includes a compact disk-read only memory (CD-ROM), a compact disk-read/write (CD-R/W), and/or a digital versatile disc (DVD). In some embodiments, at least processor 1602 or the computer readable storage medium 1604 are part of a system on a chip and are part of a Field-Programmable Gate Array (FPGA).

In some embodiments, the storage medium 1604 stores the computer program code 1606 configured to cause controller 1600 to perform one or more operations of the figures of the present disclosure.

In some embodiments, the storage medium 1604 stores instructions (e.g., computer program code 1606) for interfacing with one or more of the transmitters 100A-100B of FIGS. 1A-1B, or the receiver 200 of FIG. 2. The instructions (e.g., computer program code 1606) enable processor 1602 to generate instructions readable by the one or more of the transmitter 100A-100B of FIGS. 1A-1B, or the receiver 200 of FIG. 2.

Controller 1600 includes I/O interface 1610. I/O interface 1610 is coupled to external circuitry. In some embodiments, I/O interface 1610 includes a keyboard, keypad, mouse, trackball, trackpad, and/or cursor direction keys for communicating information and commands to processor 1602.

Controller 1600 also includes network interface 1612 coupled to the processor 1602. Network interface 1612 allows controller 1600 to communicate with network 1614, to which one or more other computer systems are connected.

Network interface 1612 includes wireless network interfaces such as BLUETOOTH, WIFI, WIMAX, GPRS, or WCDMA; or wired network interface such as ETHERNET, USB, or IEEE-13104. In some embodiments, one or more of the figures of the present disclosure is implemented in two or more systems 1600, and information such as filter, interpolator or decimator are exchanged between different systems 1600 by network 1614.

Controller 1600 is configured to receive information related to a filter through I/O interface 1610 or network interface 1612. The information is transferred to processor 1602 by bus 1608 to generate a dispersion filter. The dispersion filter is then stored in computer readable medium 1604 as dispersion filter 1616. In some embodiments, the dispersion filter 1616 includes at least dispersion filter 104, un-dispersion filter 204, or dispersion filter 300.

Controller 1600 is configured to receive information related to an interpolator through I/O interface 1610 or network interface 1612. The information is stored in computer readable medium 1604 as interpolator 1618. In some embodiments, interpolator 1618 includes interpolator 400.

Controller 1600 is configured to receive information related to a decimator through I/O interface 1610 or network interface 1612. The information is stored in computer readable medium 1604 as decimator 1620. In some embodiments, decimator 1620 includes decimator 500.

Controller 1600 is configured to receive information related to a filter through I/O interface 1610 or network interface 1612. The information is stored in computer readable medium 1604 as filter 1622. In some embodiments, filter 1622 includes at least filter 310, FIR filter 600A, IIR filter 600B, FFT filter 600C, all-pass filter 1200, time reversal filter 1500.

In some embodiments, at least portions of the present disclosure is implemented as a standalone software application for execution by a processor. In some embodiments, at least portions of the present disclosure is implemented as a software application that is a part of an additional software application. In some embodiments, at least portions of the present disclosure are implemented as a plug-in to a software application.

FIG. 17 is a flowchart of a method 1700 of operating a system, in accordance with some embodiments.

In some embodiments, FIG. 17 is a flowchart of a method 1700 of operating at least the transmitters 100A-100B of FIGS. 1A-1B, receiver 200 of FIG. 2, dispersion filter 300 of FIG. 3, decimator 400 of FIG. 4, interpolator 500, FIR filter 600A of FIG. 6A, IIR filter 600B of FIG. 6B, FFT filter 600C of FIG. 6C, all-pass filter 1200 of FIG. 12, time reversed filter 1500 of FIG. 15 or controller 1600 of FIG. 1600. It is understood that additional operations may be performed before, during, and/or after the method 1700 depicted in FIG. 17, and that some other operations may only be briefly described herein. In some embodiments, other orders of operations of method 1700 are within the scope of the present disclosure. In some embodiments, one or more operations of method 1700 are not performed.

Method 1700 includes exemplary operations, but the operations are not necessarily performed in the order shown. Operations may be added, replaced, changed order, and/or eliminated as appropriate, in accordance with the spirit and scope of the disclosed embodiments. It is understood that method 1700 utilizes features of one or more of FIGS. 1A-1B, 2-5, 6A-6C, 7A-7C, 8A-8B, 9, 10A-10D, 11A-11B and 12-16.

In operation 1702 of method 1700, a Loran pulse signal is generated by a Loran pulse generator 102. In some embodiments, the Loran pulse signal of method 1700 includes set of Loran pulses or signals LPO.

In operation 1704 of method 1700, a dispersed Loran signal is generated based on the Loran pulse signal. In some embodiments, the dispersed Loran signal of method 1700 is generated by a dispersion filter. In some embodiments, the dispersed Loran signal of method 1700 includes dispersed signal DFO. In some embodiments, the dispersion filter of method 1700 includes at least dispersion filter 104, un-dispersion filter 204 or dispersion filter 300.

In operation 1706 of method 1700, an equalized signal is generated responsive to the Loran pulse signal or the dispersed Loran signal. In some embodiments, the equalized signal of method 1700 is generated by an equalizer 106. In some embodiments, the equalized signal of method 1700 includes equalized dispersed signal DFOE.

In some embodiments, operation 1706 includes generating the equalized signal responsive to the Loran pulse signal. In some embodiments, operation 1706 includes generating the equalized signal responsive to the dispersed Loran signal.

In operation 1708 of method 1700, an amplified signal is generated based on the dispersed Loran signal. In some embodiments, the amplified signal of method 1700 is generated by a power amplifier 108. In some embodiments, the amplified signal of method 1700 includes amplified signal DFA.

In some embodiments, the equalizer 106 is coupled between the dispersion filter 104 and the power amplifier 108 (e.g., as shown in FIG. 1A), and therefore operation 1706 includes generating the equalized signal responsive to the dispersed Loran signal, and operation 1704 includes generating the dispersed Loran signal responsive to the Loran pulse signal, and operation 1708 includes generating the amplified signal responsive to the equalized signal.

In some embodiments, the equalizer 106 is coupled between the Loran pulse generator 102 and the dispersion filter 104 (e.g., as shown in FIG. 1B), and therefore operation 1706 occurs before operation 1704, and operation 1704 is subsequently followed by operation 1708. In these embodiments, where the equalizer 106 is coupled between the Loran pulse generator 102 and the dispersion filter 104 (e.g., as shown in FIG. 1B), operation 1706 includes generating the equalized signal responsive to the Loran pulse signal, operation 1704 includes generating the dispersed Loran signal responsive to the equalized signal, and operation 1708 includes generating the amplified signal responsive to the dispersed Loran signal.

In operation 1710 of method 1700, a tuned signal is generated responsive to the amplified signal. In some embodiments, the tuned signal of method 1700 is generated by an antenna tuner 110 that is coupled to the power amplifier. In some embodiments, the tuned signal of method 1700 includes tuned signal Pout.

In operation 1712 of method 1700a, a transmitted signal is radiated responsive to the tuned signal. In some embodiments, the transmitted signal of method 1700 is radiated by an antenna 112 that is coupled to the antenna tuner. In some embodiments, the transmitted signal of method 1700 includes transmitted signal TX.

In operation 1714 of method 1700, a signal is received by a receiver 200. In some embodiments, the signal of method 1700 that is received includes received signal RX.

In operation 1716 of method 1700, an undispersed pulse signal is generated responsive to the received signal. In some embodiments, the undispersed pulse signal is generated by an un-dispersion filter. In some embodiments, the un-dispersion filter of method 1700 includes un-dispersion filter 204 or dispersion filter 300. In some embodiments, the undispersed pulse signal of method 1700 includes undispersed pulse signal LPIN. In some embodiments, the received signal of method 1700 corresponds to the transmitted signal.

In operation 1718 of method 1700, a Loran signal is generated responsive to the undispersed pulse signal. In some embodiments, the Loran signal is generated by a Loran receiver 206 that is coupled to the un-dispersion filter 204. In some embodiments, the Loran signal that is generated by the Loran receiver 206 of method 1700 includes output signal LS.

By operating method 1700, the system operates to achieve the benefits discussed above with respect to FIGS. 1A-1B, 2-5, 6A-6C, 7A-7C, 8A-8B, 9, 10A-10D, 11A-11B and 12-16.

A number of embodiments have been described. It will nevertheless be understood that various modifications may be made without departing from the spirit and scope of the disclosure. The low or high logical value of various signals used in the above description is also for illustration. Various embodiments are not limited to a particular logical value when a signal is activated and/or deactivated. Selecting different logical values is within the scope of various embodiments. Various signals are generated by corresponding circuits, but, for simplicity, the circuits are not shown.

Various figures show FIR, IIR or FFT filters for illustration. Equivalent circuitry or filters may be used for the FIR, IIR or FFT filters. For example, other filter types can be used in place of the FIR, IIR or FFT filters. The above illustrations include exemplary steps, but the steps are not necessarily performed in the order shown. Steps may be added, replaced, changed order, and/or eliminated as appropriate, in accordance with the spirit and scope of disclosed embodiments.

One aspect of this description relates to a transmitter. In some embodiments, the transmitter includes a Loran pulse generator configured to generate a Loran pulse signal; a dispersion filter coupled to the Loran pulse generator, and configured to generate a dispersed signal responsive to the Loran pulse signal; an equalizer coupled to the dispersion filter, and configured to generate an equalized dispersed signal responsive to the dispersed signal; a power amplifier coupled to the equalizer, and configured to generate an amplified signal responsive to the equalized dispersed signal; an antenna tuner coupled to the power amplifier, and configured to generate a tuned signal responsive to the amplified signal; and an antenna coupled to the antenna tuner, and configured to radiate a transmitted signal responsive to the tuned signal.

In some embodiments, the dispersion filter includes a Hilbert transform device configured to receive the Loran pulse signal, and to generate a first signal and a second signal offset from the first signal by a phase of 90 degrees. In some embodiments, the dispersion filter further includes a first multiplier coupled to the Hilbert transform device, and configured to generate a frequency shifted signal in response to at least a first carrier signal, the first signal and the second signal. In some embodiments, the dispersion filter further includes a decimator coupled to the first multiplier, and configured to generate a down-sampled signal in response to the frequency shifted signal. In some embodiments, the dispersion filter further includes a first filter coupled to the decimator, and configured to generate a filtered down-sampled signal in response to the down-sampled signal. In some embodiments, the dispersion filter further includes an interpolator coupled to the first filter, and configured to generate an up-sampled signal in response to the filtered down-sampled signal. In some embodiments, the dispersion filter further includes a second multiplier coupled to the interpolator, and configured to generate the dispersed signal in response to at least the up-sampled signal and a second carrier signal, the second carrier signal being a conjugate of the first carrier signal.

In some embodiments, the decimator includes a low pass filter coupled to the first multiplier, and configured to generate a first filtered signal in response to the frequency shifted signal, the first filtered signal having a first sample frequency. In some embodiments, the decimator further includes a first circuit coupled to the low pass filter, and configured to delete N−1 samples of N samples of the first filtered signal thereby generating the down-sampled signal, wherein N is an integer, and the down-sampled signal has a second sample frequency equal to the first sample frequency divided by the N samples.

In some embodiments, the interpolator includes a first circuit coupled to the first filter, and configured to add N−1 zeros to the filtered down-sampled signal thereby generating a first signal, wherein N is an integer, the first signal has a first sample frequency, and the filtered down-sampled signal has a second sample frequency equal to the first sample frequency divided by the N samples. In some embodiments, the interpolator further includes a low pass filter coupled to the first circuit, and configured to generate a first filtered signal in response to the first signal. In some embodiments, the first filter includes a FIR filter, an IIR filter, or a FFT filter. In some embodiments, the IIR filter corresponds to an all-pass filter having randomly generated coefficients.

In some embodiments, the IIR filter includes a first time reversal circuit configured to generate a first time-reversed signal responsive to a first received signal, the first received signal corresponding to the down-sampled signal. In some embodiments, the IIR filter further includes a first circuit coupled to the first time reversal circuit, and configured to generate a conjugate of the first time-reversed signal responsive to the first time-reversed signal. In some embodiments, the IIR filter further includes a first filter coupled to the first circuit, and configured to filter the conjugate of the first time-reversed signal thereby generating a filtered first signal. In some embodiments, the IIR filter further includes a second circuit coupled to the first filter, and configured to generate a conjugate of the filtered first signal responsive to the filtered first signal. In some embodiments, the IIR filter further includes a second time reversal circuit coupled to the second circuit, and configured to generate a second time-reversed signal responsive to the conjugate of the filtered first signal, the second time-reversed signal corresponding to the filtered down-sampled signal.

In some embodiments, the FIR filter, the IIR filter or the FFT filter includes fixed filter coefficients for each set of Loran pulses, the Loran pulse signal being part of the set of Loran pulses. In some embodiments, the FIR filter, the IIR filter or the FFT filter includes dynamic filter coefficients that are time varying over a set of Loran pulses, the Loran pulse signal being part of the set of Loran pulses.

Another aspect of this description relates to a Loran system. In some embodiments, the Loran system includes a transmitter and a receiver. In some embodiments, the transmitter includes a Loran pulse generator configured to generate a Loran pulse signal; an equalizer coupled to the Loran pulse generator, and configured to generate an equalized pulse signal responsive to the Loran pulse signal; a dispersion filter coupled to the equalizer, and configured to generate a dispersed Loran signal responsive to the equalized pulse signal; a power amplifier coupled to the dispersion filter, and configured to generate an amplified signal responsive to the dispersed Loran signal; an antenna tuner coupled to the power amplifier, and configured to generate a tuned signal responsive to the amplified signal; and a first antenna coupled to the antenna tuner, and configured to radiate a transmitted signal responsive to the tuned signal. In some embodiments, the receiver includes a second antenna configured to receive a received signal; an un-dispersion filter coupled to the second antenna, and configured to generate an undispersed pulse signal responsive to the received signal, the received signal corresponding to the transmitted signal; and a Loran receiver coupled to the un-dispersion filter, and configured to generate a Loran signal responsive to the undispersed pulse signal.

In some embodiments, the un-dispersion filter includes a Hilbert transform device configured to receive the received signal, and to generate a first signal and a second signal offset from the first signal by a phase of 90 degrees. In some embodiments, the un-dispersion filter further includes a first multiplier coupled to the Hilbert transform device, and configured to generate a frequency shifted signal in response to at least a first carrier signal, the first signal and the second signal. In some embodiments, the un-dispersion filter further includes a decimator coupled to the first multiplier, and configured to generate a down-sampled signal in response to the frequency shifted signal. In some embodiments, the un-dispersion filter further includes a first filter coupled to the decimator, and configured to generate a filtered down-sampled signal in response to the down-sampled signal. In some embodiments, the un-dispersion filter further includes an interpolator coupled to the first filter, and configured to generate an up-sampled signal in response to the filtered down-sampled signal. In some embodiments, the un-dispersion filter further includes a second multiplier coupled to the interpolator, and configured to generate the undispersed pulse signal in response to at least the up-sampled signal and a second carrier signal, the second carrier signal being a conjugate of the first carrier signal.

In some embodiments, the decimator includes a low pass filter coupled to the first multiplier, and configured to generate a first filtered signal in response to the frequency shifted signal, the first filtered signal having a first sample frequency. In some embodiments, the decimator further includes a first circuit coupled to the low pass filter, and configured to delete N−1 samples of N samples of the first filtered signal thereby generating the down-sampled signal, wherein N is an integer, and the down-sampled signal has a second sample frequency equal to the first sample frequency divided by the N samples.

In some embodiments, the interpolator includes a first circuit coupled to the first filter, and configured to add N−1 zeros to the filtered down-sampled signal thereby generating a first signal, wherein N is an integer, the first signal has a first sample frequency, and the filtered down-sampled signal has a second sample frequency equal to the first sample frequency divided by the N samples. In some embodiments, the interpolator further includes a low pass filter coupled to the first circuit, and configured to generate a first filtered signal in response to the first signal. In some embodiments, the first filter includes a FIR filter, an IIR filter, or a FFT filter.

In some embodiments, the FIR filter, the IIR filter or the FFT filter includes dynamic filter coefficients that are time varying over a set of Loran pulses, the Loran pulse signal being part of the set of Loran pulses. In some embodiments, the FIR filter, the IIR filter or the FFT filter includes fixed filter coefficients for each set of Loran pulses, the Loran pulse signal being part of the set of Loran pulses. In some embodiments, the FFT filter includes a first circuit configured to perform an FFT on a first signal thereby generating an FFT signal, the first signal corresponding to the down-sampled signal; a second circuit coupled to the first circuit, and configured to add weighted filter coefficients to samples of the FFT signal thereby generating a weighted FFT signal; and a third circuit coupled to the second circuit, and configured to perform an inverse FFT on the weighted FFT signal thereby generating a second signal, the second signal corresponding to the filtered down-sampled signal.

Still another aspect of this description relates to a method. The method includes generating, by a Loran pulse generator, a Loran pulse signal; generating, by a dispersion filter, a dispersed Loran signal based on the Loran pulse signal; generating, by a power amplifier, an amplified signal based on the dispersed Loran signal; generating, by an antenna tuner coupled to the power amplifier, a tuned signal responsive to the amplified signal; and radiating, by an antenna coupled to the antenna tuner, a transmitted signal responsive to the tuned signal.

In some embodiments, the method further includes generating, by an equalizer, an equalized signal responsive to the Loran pulse signal. In some embodiments, generating the dispersed Loran signal includes generating the dispersed Loran signal responsive to the equalized signal, wherein the equalizer is coupled between the Loran pulse generator and the dispersion filter; and generating the amplified signal includes generating the amplified signal responsive to the dispersed Loran signal.

In some embodiments, the method further includes generating, by an equalizer, an equalized signal responsive to the dispersed Loran signal. In some embodiments, generating the dispersed Loran signal includes generating the dispersed Loran signal responsive to the Loran pulse signal; and generating the amplified signal includes generating the amplified signal responsive to the equalized signal, wherein the equalizer is coupled between the dispersion filter and the power amplifier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transmission system comprising:
a transmitter comprising:
a Loran pulse generator configured to generate a Loran pulse group, wherein a Loran pulse group comprises a sequence of multiple Loran signals spaced apart in time;
a dispersion filter coupled to the Loran pulse generator, and configured to be concurrently applied to the Loran pulse group in order to generate a dispersed signal responsive to the Loran pulse group, wherein the dispersed signal is adapted to have a lower peak envelope power and to subject at least one antenna to a voltage stress that is reduced relative to a Loran pulse group that is not subjected to the dispersion filter;
an equalizer coupled to the dispersion filter, and configured to generate an equalized dispersed signal responsive to the dispersed signal;
a power amplifier coupled to the equalizer, and configured to generate an amplified signal responsive to the equalized dispersed signal; and
an antenna tuner coupled to the power amplifier, and configured to generate a tuned signal responsive to the amplified signal; and
the at least one antenna coupled to the transmitter, and configured to radiate a transmitted signal responsive to the tuned signal, wherein the at least one antenna is configured to present reactive impedances at certain frequencies of the transmitted signal to the transmitter such that the transmitter's output current or voltage increases while radiated power does not increase.

2. The transmitter of claim 1, wherein the dispersion filter comprises:
a Hilbert transform device configured to receive the Loran pulse group, and to generate a first signal and a second signal offset from the first signal by a phase of 90 degrees;
a first multiplier coupled to the Hilbert transform device, and configured to generate a frequency shifted signal in response to at least a first carrier signal, the first signal and the second signal;
a decimator coupled to the first multiplier, and configured to generate a down-sampled signal in response to the frequency shifted signal;
a first filter coupled to the decimator, and configured to generate a filtered down-sampled signal in response to the down-sampled signal;
an interpolator coupled to the first filter, and configured to generate an up-sampled signal in response to the filtered down-sampled signal; and
a second multiplier coupled to the interpolator, and configured to generate the dispersed signal in response to at least the up-sampled signal and a second carrier signal, the second carrier signal being a conjugate of the first carrier signal.

3. The transmitter of claim 2, wherein the decimator comprises:
a low pass filter coupled to the first multiplier, and configured to generate a first filtered signal in response to the frequency shifted signal, the first filtered signal having a first sample frequency; and
a first circuit coupled to the low pass filter, and configured to delete N−1 samples of N samples of the first filtered signal thereby generating the down-sampled signal, wherein N is an integer, and the down-sampled signal has a second sample frequency equal to the first sample frequency divided by the N samples.

4. The transmitter of claim 2, wherein the interpolator comprises:
a first circuit coupled to the first filter, and configured to add N−1 zeros to the filtered down-sampled signal thereby generating a first signal, wherein N is an integer, the first signal has a first sample frequency, and the filtered down-sampled signal has a second sample frequency equal to the first sample frequency divided by the N samples; and
a low pass filter coupled to the first circuit, and configured to generate a first filtered signal in response to the first signal.

5. The transmitter of claim 2, wherein the first filter comprises:
a finite impulse response (FIR) filter;
an infinite impulse response (IIR) filter; or
a fast Fourier transform (FFT) filter.

6. The transmitter of claim 5, wherein the IIR filter corresponds to an all-pass filter having randomly generated coefficients.

7. The transmitter of claim 6, wherein the IIR filter comprises:
a first time reversal circuit configured to generate a first time-reversed signal responsive to a first received signal, the first received signal corresponding to the down-sampled signal;
a first circuit coupled to the first time reversal circuit, and configured to generate a conjugate of the first time-reversed signal responsive to the first time-reversed signal;
a first filter coupled to the first circuit, and configured to filter the conjugate of the first time-reversed signal thereby generating a filtered first signal;
a second circuit coupled to the first filter, and configured to generate a conjugate of the filtered first signal responsive to the filtered first signal; and
a second time reversal circuit coupled to the second circuit, and configured to generate a second time-reversed signal responsive to the conjugate of the filtered first signal, the second time-reversed signal corresponding to the filtered down-sampled signal.

8. The transmitter of claim 5, wherein the FIR filter, the IIR filter or the FFT filter includes fixed filter coefficients for each of the multiple Loran signals.

9. The transmitter of claim 5, wherein the FIR filter, the IIR filter or the FFT filter includes dynamic filter coefficients that are time varying over the multiple Loran signals.

10. A Loran system comprising:
a transmitter comprising:
a Loran pulse generator configured to generate a Loran pulse group, wherein a Loran pulse group comprises a sequence of multiple Loran signals spaced apart in time;
an equalizer coupled to the Loran pulse generator, and configured to generate an equalized pulse group responsive to the Loran pulse group;
a dispersion filter coupled to the equalizer, and configured to be concurrently applied to the Loran pulse group in order to generate a dispersed Loran signal responsive to the equalized pulse group, wherein the dispersed signal is adapted to have a lower peak envelope power and to subject at least one first antenna to a voltage stress that is reduced relative to a Loran pulse group that is not subjected to the dispersion filter;
a power amplifier coupled to the dispersion filter, and configured to generate an amplified signal responsive to the dispersed Loran signal; and
an antenna tuner coupled to the power amplifier, and configured to generate a tuned signal responsive to the amplified signal;
the at least one first antenna coupled to the transmitter, and configured to radiate a transmitted signal responsive to the tuned signal, wherein the at least one antenna is configured to present reactive impedances at certain frequencies of the transmitted signal to the transmitter such that the transmitter's output current or voltage increases while radiated power does not increase;

a receiver comprising:
at least one second antenna configured to receive a received signal;
an un-dispersion filter coupled to the at least one second antenna, and configured to generate an undispersed pulse group responsive to the received signal, the received signal corresponding to the transmitted signal; and
a Loran receiver coupled to the un-dispersion filter, and configured to generate a Loran signals responsive to the undispersed pulse group.

11. The Loran system of claim 10, wherein the un-dispersion filter comprises:
a Hilbert transform device configured to receive the received signal, and to generate a first signal and a second signal offset from the first signal by a phase of 90 degrees;
a first multiplier coupled to the Hilbert transform device, and configured to generate a frequency shifted signal in response to at least a first carrier signal, the first signal and the second signal;
a decimator coupled to the first multiplier, and configured to generate a down-sampled signal in response to the frequency shifted signal;
a first filter coupled to the decimator, and configured to generate a filtered down-sampled signal in response to the down-sampled signal;
an interpolator coupled to the first filter, and configured to generate an up-sampled signal in response to the filtered down-sampled signal; and
a second multiplier coupled to the interpolator, and configured to generate the undispersed pulse signal in response to at least the up-sampled signal and a second carrier signal, the second carrier signal being a conjugate of the first carrier signal.

12. The Loran system of claim 11, wherein the decimator comprises:
a low pass filter coupled to the first multiplier, and configured to generate a first filtered signal in response to the frequency shifted signal, the first filtered signal having a first sample frequency; and
a first circuit coupled to the low pass filter, and configured to delete N−1 samples of N samples of the first filtered signal thereby generating the down-sampled signal, wherein N is an integer, and the down-sampled signal has a second sample frequency equal to the first sample frequency divided by the N samples.

13. The Loran system of claim 11, wherein the interpolator comprises:
a first circuit coupled to the first filter, and configured to add N−1 zeros to the filtered down-sampled signal thereby generating a first signal, wherein N is an integer, the first signal has a first sample frequency, and the filtered down-sampled signal has a second sample frequency equal to the first sample frequency divided by the N samples; and
a low pass filter coupled to the first circuit, and configured to generate a first filtered signal in response to the first signal.

14. The Loran system of claim 11, wherein the first filter comprises:
a finite impulse response (FIR) filter;
an infinite impulse response (IIR) filter; or
a fast Fourier transform (FFT) filter.

15. The Loran system claim 14, wherein the FIR filter, the IIR filter or the FFT filter includes dynamic filter coefficients that are time varying over the multiple Loran signals.

16. The transmitter of claim 14, wherein the FIR filter, the IIR filter or the FFT filter includes fixed filter coefficients for each of the multiple Loran signals.

17. The Loran system of claim 14, wherein the FFT filter comprises:

a first circuit configured to perform an FFT on a first signal thereby generating an FFT signal, the first signal corresponding to the down-sampled signal;

a second circuit coupled to the first circuit, and configured to add weighted filter coefficients to samples of the FFT signal thereby generating a weighted FFT signal; and a third circuit coupled to the second circuit, and configured to perform an inverse FFT on the weighted FFT signal thereby generating a second signal, the second signal corresponding to the filtered down-sampled signal.

18. A method, the method comprising:

generating, by a Loran pulse generator, a Loran pulse group, wherein a Loran pulse group comprises a sequence of multiple Loran signals spaced apart in time;

generating, by a dispersion filter concurrently applied to the Loran pulse group, a dispersed Loran signal based on the Loran pulse group such that the dispersion filter reduces voltage stress on at least one antenna relative to an undispersed Loran pulse signal, wherein the dispersed signal is adapted to have a lower peak envelope power;

generating, by a power amplifier, an amplified signal based on the dispersed Loran signal;

36 generating, by an antenna tuner coupled to the power amplifier, a tuned signal responsive to the amplified signal; and radiating, by the at least one antenna coupled to the transmitter, a transmitted signal responsive to the tuned signal, wherein the at least one antenna is configured to present reactive impedances at certain frequencies of the transmitted signal to the transmitter such that the transmitter's output current or voltage increases while radiated power does not increase.

19. The method of claim 18, further comprising:

generating, by an equalizer, an equalized signal responsive to the Loran pulse group; and wherein generating the dispersed Loran signal comprises:

generating the dispersed Loran signal responsive to the equalized signal, wherein the equalizer is coupled between the Loran pulse generator and the dispersion filter; and wherein generating the amplified signal comprises:

generating the amplified signal responsive to the dispersed Loran signal.

20. The method of claim 18, further comprising:

generating, by an equalizer, an equalized signal responsive to the dispersed Loran signal; and wherein generating the dispersed Loran signal comprises:

generating the dispersed Loran signal responsive to the Loran pulse signal; and wherein generating the amplified signal comprises:

generating the amplified signal responsive to the equalized signal, wherein the equalizer is coupled between the dispersion filter and the power amplifier.

* * * * *